United States Patent [19]

Suzuki et al.

[11] 4,417,642
[45] Nov. 29, 1983

[54] FOUR-WHEEL-DRIVE SYSTEM FOR AUTOMOTIVE VEHICLE

[75] Inventors: Kunihiko Suzuki, Fujisawa; Akihiko Muraoka, Yokohama, both of Japan

[73] Assignee: Nissan Motor Company, Limited, Yokohama, Japan

[21] Appl. No.: 249,418

[22] Filed: Mar. 31, 1981

[30] Foreign Application Priority Data

Apr. 25, 1980 [JP] Japan .................................. 55-55733

[51] Int. Cl.³ ............................................ B60K 17/34
[52] U.S. Cl. ...................................... 180/249; 74/682; 74/740; 180/297
[58] Field of Search ............... 180/233, 248, 249, 250, 180/297; 74/710.5, 714, 740, 682, 785, 788

[56] References Cited

U.S. PATENT DOCUMENTS

| | | | |
|---|---|---|---|
| 3,265,173 | 8/1966 | Russell | 74/710.5 |
| 3,350,960 | 11/1967 | Lamburn et al. | 74/740 |
| 3,378,093 | 4/1968 | Hill | 180/249 |
| 3,557,634 | 1/1971 | Bixby | 74/710.5 |
| 3,889,771 | 6/1975 | Kronogard | 180/248 |
| 4,208,923 | 6/1980 | Ikegami | 74/665 G X |

FOREIGN PATENT DOCUMENTS

| | | |
|---|---|---|
| 491645 | 9/1938 | United Kingdom . |
| 887849 | 1/1962 | United Kingdom . |
| 2064449 | 6/1981 | United Kingdom ............... 180/248 |

*Primary Examiner*—Joseph F. Peters, Jr.
*Assistant Examiner*—Ross Weaver
*Attorney, Agent, or Firm*—Lane, Aitken & Kananen

[57] ABSTRACT

A four-wheel-drive system for a vehicle, comprising a power unit having an output shaft in a lateral direction of the vehicle, a power transmission gear unit having input and output shafts parallel with the output shaft of the power unit, a speed reduction gear to be driven by the transmission output shaft, two final reduction gear units one of which is arranged for driving the front road wheels and the other of which is arranged to drive the rear road wheels of the vehicle, a series combination of two planetary gear assemblies one of which is capable of selectively producing two different gear ratios for low-speed and high-speed vehicle driving and the other of which is operatively connected between the two final reduction gear units so as to be capable of providing a differential gear action therebetween, and a low-and-high speed shifting clutch mechanism intervening between the speed reduction gear and the former planetary gear assembly.

11 Claims, 12 Drawing Figures

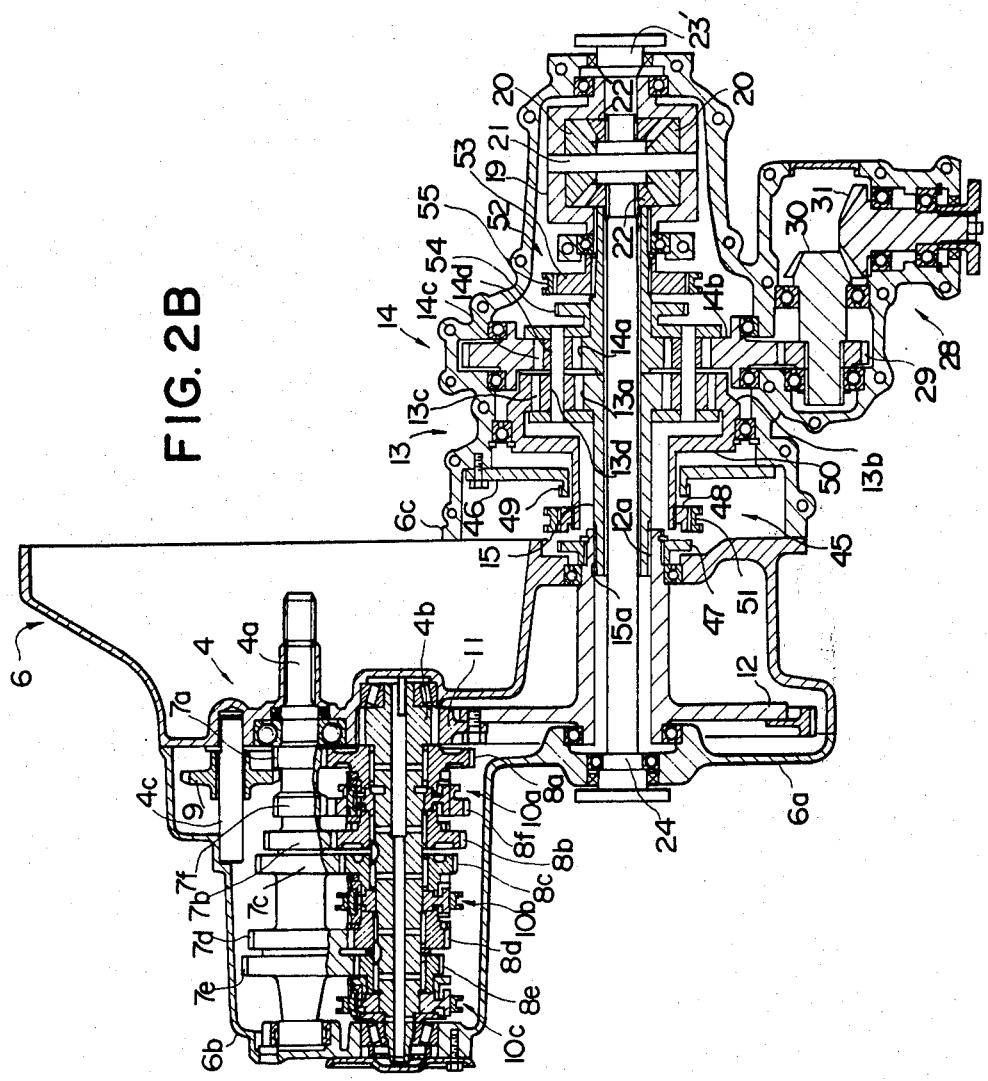

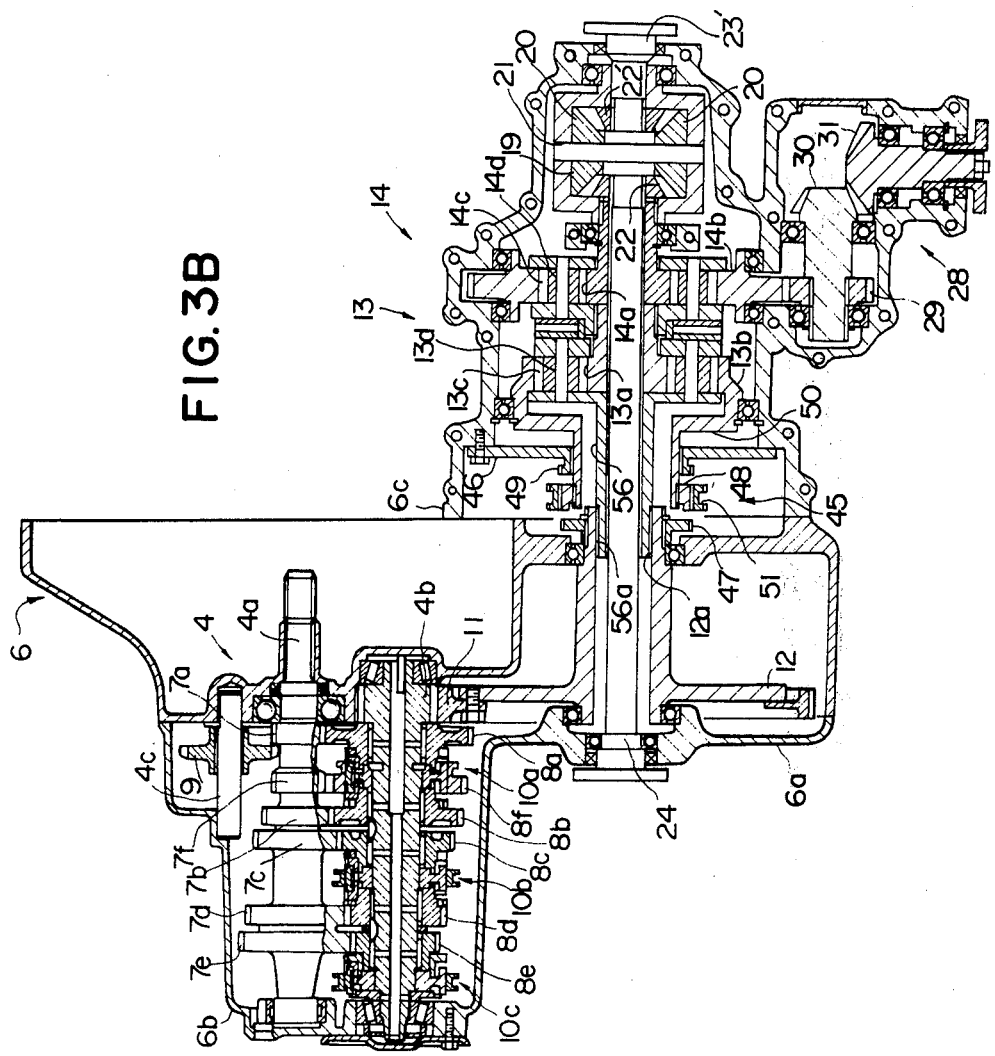

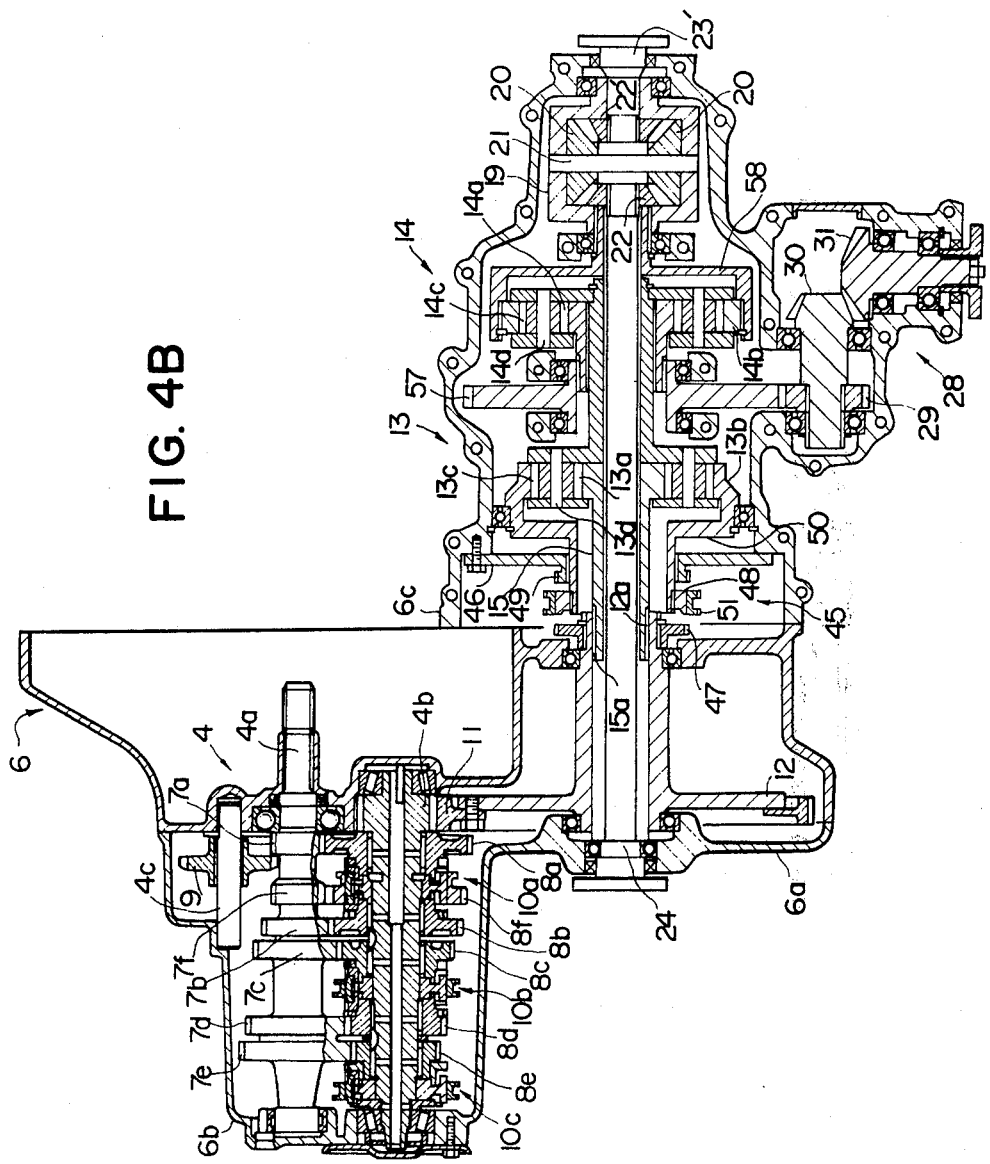

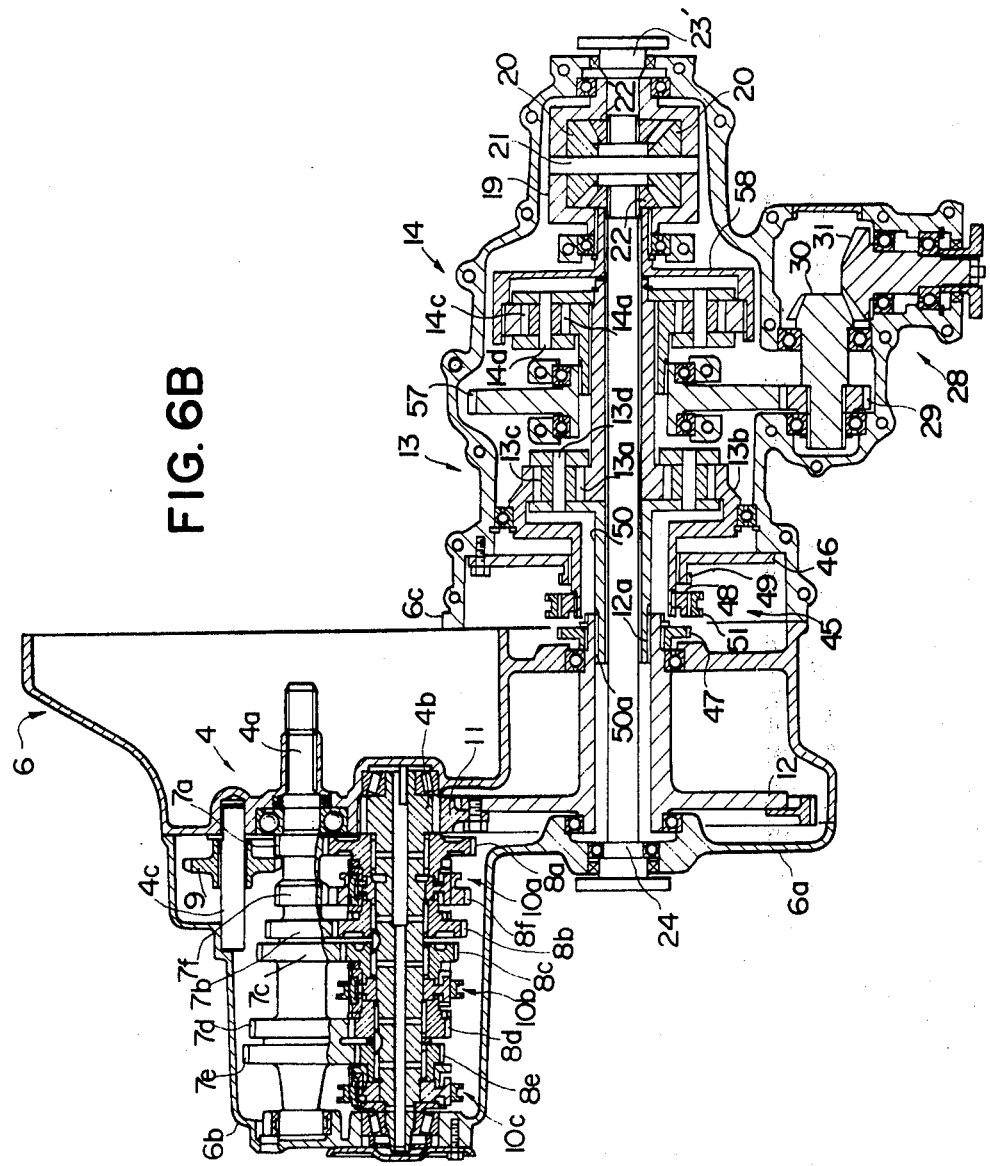

FOUR-WHEEL-DRIVE SYSTEM FOR AUTOMOTIVE VEHICLE

FIELD OF THE INVENTION

The present invention relates to a four-wheel-drive system for a vehicle having at least two pairs of road wheels consisting of a pair of front road wheels and a pair of rear road wheels and, more particularly, to a four-wheel-drive system for such a wheeled vehicle.

BACKGROUND OF THE INVENTION

A known four-wheel-driven vehicle uses a driveline including an engine and a power transmission gear unit which are arranged in series in a fore-and-aft direction of the vehicle. The driving power delivered from the engine is split by means of a power transfer mechanism into two component powers one of which is transmitted through a front final reduction gear unit to the wheel axles for the front road wheels and the other of which is transmitted through a rear final reduction gear unit to the wheel axles for the rear road wheels.

Such a series arrangement of the engine and the power transmission gear unit requires an elongated vehicle chassis and, for this reason, results in deterioration in the stability of steering due to extended overhangs of the vehicle body. Furthermore, the transmission gear unit in the series engine and transmission arrangement occupies a portion of the spaces which could otherwise be utilized as the passenger and baggage spaces, thereby encumbering the availability of the passenger and baggage spaces of the vehicle.

On the other hand, there is a recent trend to use a front-engine front-wheel-drive system with the engine positioned to have its output shaft in a lateral direction of a vehicle. Such a drive system for a wheeled vehicle is advantageous for improving the stability of steering and unencumbering the space availability of the vehicle. A problem has, however, been encountered in a vehicle driving system of this nature in that the power train including the power transmission gear unit and the front final reduction gear unit of the driving system can not be utilized without modification as the power train in a four-wheel-drive system with an engine positioned to have its output shaft in a lateral direction of the vehicle. The power train for the driving system for a four-wheel-driven vehicle must therefore be designed and engineered independently of the power train for a front-engine front-wheel-drive system. This requires an additional cost for the designing and engineering of a four-wheel-drive system with an engine positioned to have its output shaft in a lateral direction of the vehicle.

The present invention therefore contemplates provision of a four-wheel-drive system which can be realized by using, without any important modification, the power train of a conventional front-engine front-wheel-drive system with a lateral engine axis.

SUMMARY OF THE INVENTION

In accordance with the present invention, there is provided a four-wheel-drive system for a vehicle having at least two pairs of road wheels consisting of a pair of front road wheels and a pair of rear road wheels, comprising a power unit having an output shaft rotatable about an axis in a lateral direction of the vehicle; a power transmission gear unit including transmission input and output shafts each having an axis of rotation substantially parallel with the axis of rotation of the output shaft of the power unit, and gears mounted on the transmission input and output shafts and arranged to be capable of selectively producing a plurality of ratios between the speeds of rotation of the transmission input and output shafts; a speed reduction gear with which the transmission output shaft is held in driving engagement for driving the reduction gear to rotate about an axis of rotation thereof; a first final reduction gear unit including gears arranged to split an input driving power into two output components to be transmitted to one of the above mentioned two pairs of road wheels; a second final reduction gear unit including gears arranged to split an input driving power into two output components to be transmitted to the other of the aforesaid two pairs of road wheels; first and second planetary gear assemblies each including an externally toothed sun gear rotatable about an axis of rotation thereof, an externally toothed ring gear coaxially encircling the sun gear and rotatable about the axis of rotation of the sun gear, at least two planet pinions each held in mesh with the sun gear and the ring gear and rotatable about an axis of rotation substantially parallel with the axis of rotation of the sun gear, and a pinion carrier interconnecting the planet pinions together so that the planet pinions are revolvable together around the axis of rotation of the sun gear, the speed reduction gear being held in driving engagement with one of the sun gear and the pinion carrier of the first planetary gear assembly, the other of the sun gear and the pinion carrier of the first planetary gear assembly being connected to and rotatable with the pinion carrier of the second planetary gear assembly, one of the sun gear and the ring gear of the second planetary gear assembly being in driving connection to one of the first and second final reduction gear unit and the other of the sun gear and the ring gear of the second planetary gear assembly being in driving connection to the other of said first and second final reduction gear units; a stationary member to be held stationary in the vehicle; and a low-high-speed shifting clutch means operative to provide coupling selectively between said speed reduction gear and the ring gear of the first planetary gear assembly and between said stationary member and the ring gear of the first planetary gear assembly.

DESCRIPTION OF THE DRAWINGS

The features and advantages of the four-wheel-drive system according to the present invention will be more clearly understood from the following description in which like reference numerals and characters designate corresponding or similar members and structures throughout the figures of the drawings and in which:

FIG. 2B is a fragmentary sectional view showing part of the detailed construction and arrangement of the embodiment illustrated in FIG. 2A;

FIG. 3B is a fragmentary sectional view showing part of the detailed construction and arrangement of the embodiment illustrated in FIG. 3A;

FIG. 4B is a fragmentary sectional view showing part of the detailed construction and arrangement of the embodiment illustrated in FIG. 4A;

FIG. 6B is a fragmentary sectional view showing part of the detailed construction and arrangement of the embodiment illustrated in FIG. 6A.

DESCRIPTION OF THE EMBODIMENTS

Description will be hereinafter made regarding the embodiments of the vehicle driving system according to the present invention.

Figure 1A:
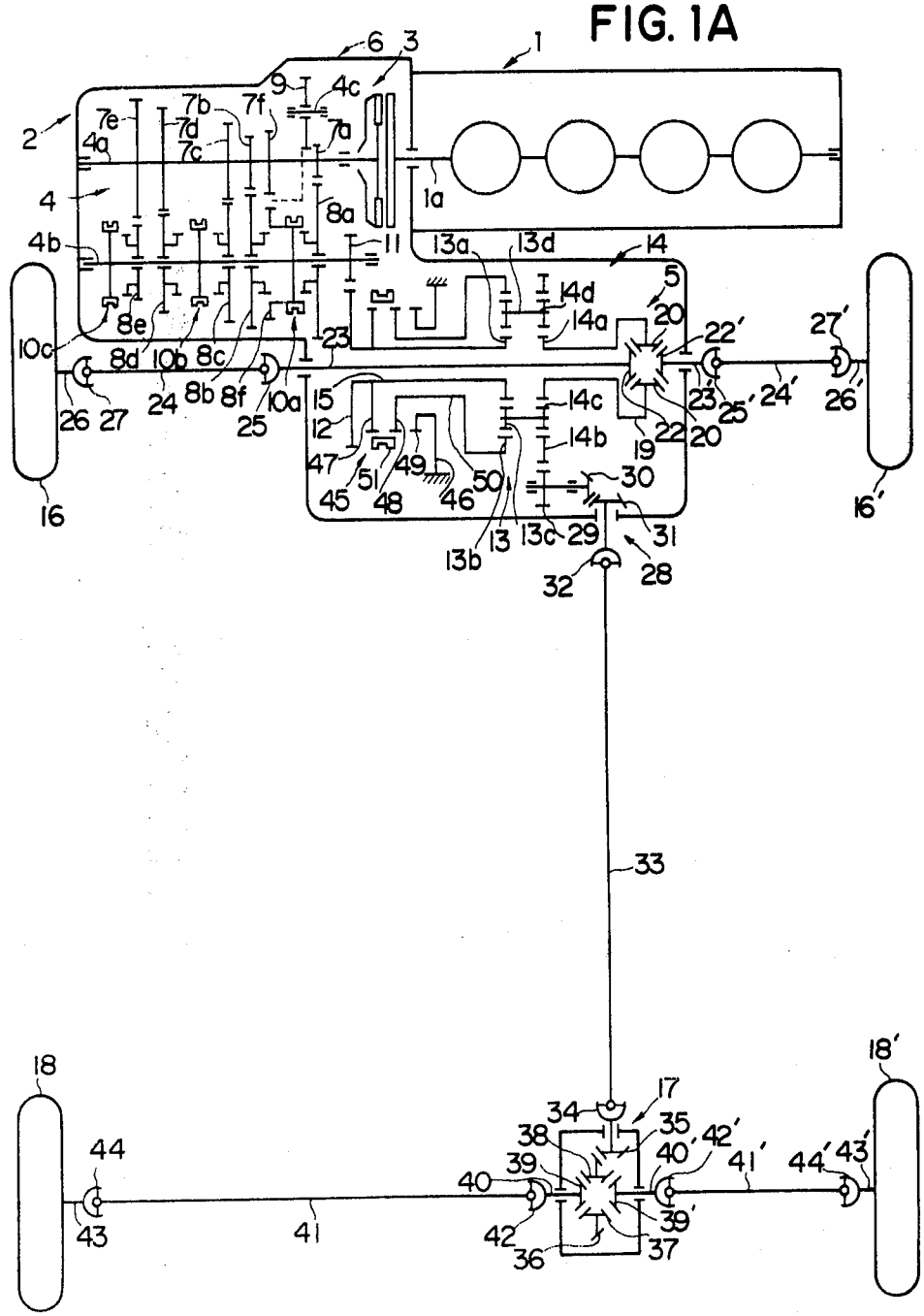
FIG. 1A is a schematic view showing the general construction of a first preferred embodiment of the four-wheel-drive system according to the present invention.
Figure 1B:
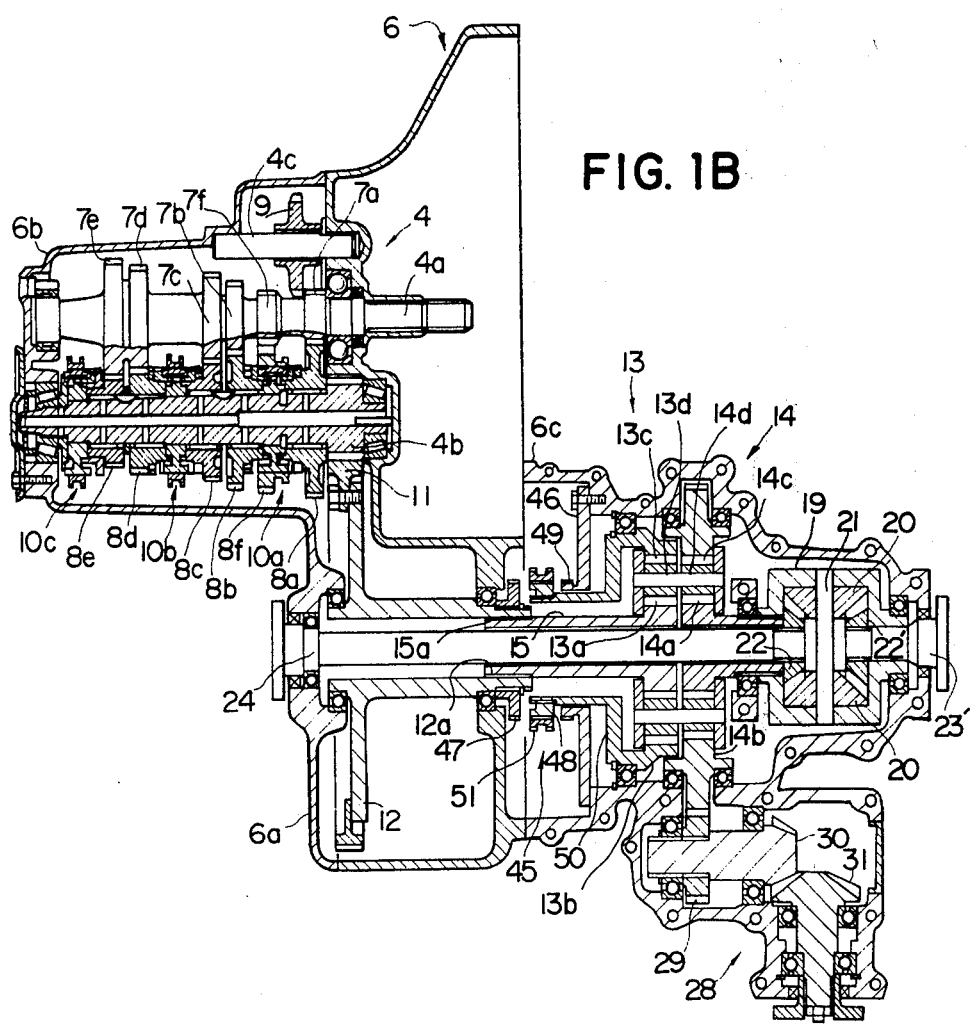
FIG. 1B is a fragmentary sectional view showing part of the detailed construction and arrangement of the embodiment illustrated in FIG. 1A.

Referring to FIGS. 1A and 1B of the drawings, the four-wheel-drive system embodying the present invention comprises a power unit which is shown constituted by an internal combustion engine 1 having an output shaft 1a. The four-wheel-drive system proposed by the present invention features the crosswise-positioned engine arrangement and, thus, the engine 1 is installed on the chassis of a wheeled vehicle in such a manner that the output shaft 1a extends horizontally in a lateral direction of the chassis. Furthermore, the four-wheel-drive system embodying the present invention is assumed, by way of example, as being of the front-engine design and, thus, the engine 1 is positioned at the front of the chassis of the vehicle. When the engine 1 is of the reciprocating-piston type, the output shaft 1a thereof is constituted by the crankshaft of the engine.

The four-wheel-drive driving system embodying the present invention further comprises a manually operated transmission-front-axle or, briefly, transaxle mechanism 2 which includes a mechanical clutch unit 3, a manually-operated power transmission gear unit 4, and a front final reduction gear unit 5. The mechanical clutch unit 3 comprises a driving member connected to the output shaft 1a of the engine 1 and a driven member engageable with the driving member and connected to a transmission input shaft 4a forming part of the transmission gear unit 4. The clutch unit 3 further comprises a pressing member axially movable on the transmission input shaft 4a and is adapted to force the driven member into engagement with the driving member when actuated for axial movement on the shaft 4a. The pressing member is biased by means of a spring (not shown) for connecting the driven member to the driving member, as is well known in the art.

The transmission input shaft 4a axially extends in alignment with the output shaft 1a of the internal combustion engine 1 and is journalled in a suitable bearing supported on a transaxle casing structure 6. The transmission gear unit 4 is assumed, by way of example, as being of the five-forward-speed and one-reverse-speed type and comprises a total of six drive gears fixedly mounted on or intergral with the transmission input shaft 4a and axially spaced apart from each other on the shaft 4a. The drive gears consists of a first-speed forward drive gear 7a, a second-speed forward drive gear 7b, a third-speed forward drive gear 7c, a fourth-speed forward drive gear 7d, a fifth-speed forward drive gear 7e, and a reverse drive gear 7f.

The transaxle casing structure 6 has further supported thereon a transmission output shaft 4b which axially extends in parallel with the transmission input shaft 4a and which has opposite axial end portions respectively journaled in suitable bearings mounted on the casing structure 6. The transmission output shaft 4b has coaxially mounted thereon a total of six driven gears which are axially spaced apart from each other on the shaft 4b and which are freely rotatable independently of one another on the shaft 4b about the center axis of the shaft 4b. The driven gears on the transmission output shaft 4b consist of a first-speed forward driven gear 8a, a second-speed forward driven gear 8b, a third-spaced forward driven gear 8c, a fourth-speed forward driven gear 8d, a fifth-speed forward driven gear 8e, and a reverse driven gear 8f. The first-speed to fifth-speed driven gears 8a to 8e on the transmission output shaft 4b are paired and held in mesh with the first-speed to fifth-speed drive gears 7a to 7e, respectively, on the transmission input shaft 4a. On the other hand, the reverse driven gear 8f on the output shaft 4b is engageable with the reverse drive gear 7f on the input shaft 4a through the intermediary of a reverse idler gear 9 axially movable and coaxially rotatable on an idler gear shaft 4c. The idler gear shaft 4c also extends axially in parallel with the transmission input shaft 4a and is secured to the transaxle casing structure 6.

The power transmission gear unit 4 is assumed, by way of example, as being of the fully synchronized type and, thus, further comprises three synchronizing clutch assemblies each of which is coaxially mounted on and rotatable with the transmission output shaft 4b. The synchronizing clutch assemblies are shown consisting of a first-second-speed synchronzing clutch assembly 10a, a third-fourth-speed synchronizing clutch assembly 10b, and a fifth-speed synchronizing clutch assembly 10c. The first-second-speed synchronizing clutch assembly 10a axially intervenes between the first-speed and second-speed forward driven gears 8a and 8b and is selectively engageable with these gears 8a and 8b and, likewise, the third-fourth-speed synchronizing clutch assembly 10b axially intervenes between the third-speed and fourth-speed forward driven gears 8c and 8d and is selectively engageable with these gears 8c and 8d. The fifth-speed synchronizing clutch assembly 10c is provided in association with the fifth-speed forward driven gear 8e and is engageable with the gear 8e.

As is well known in the art and will be seen from the illustration of FIG. 1B, each of the synchronizing clutch assemblies 10a and 10b is largely composed of an externally toothed clutch hub splined to the transmission output shaft 4b between the gears 8a and 8b or gears 8c and 8d, a pair of externally toothed synchronizing or blocking rings positioned adjacent to the opposite axial ends of the clutch hub and engageable with the clutch hub, and an internally toothed annular coupling sleeve held in mesh with and axially movable on the clutch hub. The synchronizing rings of each of the clutch assemblies 10a and 10b are rotatable with the gears 8a and 8b or the gears 8c and 8d, respectively. The synchronizing clutch assembly 10c is constructed similarly to each of the clutch assemblies 10a and 10b but has only one synchronizing ring rotatable with the gear 8e. Each of the gears 8a to 8e has or is formed with a coupling gear section adjacent to the associated synchronizing ring. The coupling sleeve of each of the clutch assemblies 10a, 10b and 10c is axially movable into engagement with the coupling gear section of one or the other of the gears 8a and 8b or gears 8c and 8d of the gear 8e past the associated synchronizing ring so as to establish synchronized coupling between the transmission output shaft 4b and the gear engaged by the coupling sleeve. The coupling sleeve of each clutch assembly is formed with a circumferential groove through which a gear shifter fork (not shown) is held in circumferentially slidable engagement with the sleeve. The shifter forks thus engaging the respective coupling sleeves of the individual clutch assemblies 10a, 10b and 10c are, in turn, respectively carried on gearshift control rods or rails which are operatively connected to or engaged by a manually operated gearshift lever through suitable gearshift control linkages, though not shown in the drawings.

The reverse driven gear 8f is constituted as part of the coupling sleeve of the first-second-speed synchronizing clutch assembly 10a. The reverse idler gear 9 is engaged by a gear shifter fork (not shown) carried on the gearshift control rod or rail carrying the shifter fork engaging the coupling sleeve of the fifth-speed synchronizing clutch assembly 10c. The shafts 4a to 4c and all the gears and clutch assemblies mounted on these shafts are enclosed within the transaxle casing structure 6.

The construction and arrangement of the transmission gear unit 4 as hereinbefore described and shown in FIGS. 1A and 1B is per se simply for the purpose of illustration and may therefore be changed and/or modified in numerous manners as desired.

The output shaft 4b of the transmission gear unit 4 has fixedly mounted thereon a transmission output gear 11 which is rotatable about the center axis of the shaft 4b.

The transaxle mechanism 2 of the embodiment shown in FIGS. 1A and 1B further includes a speed reduction gear 12 enclosed together with the transmission gear unit 4 and the front final reduction gear unit 5 within the transaxle casing structure 6.

The speed reduction gear 12 has opposite axial extensions or boss portions respectively journaled in suitable bearings supported on the tranaxle casing structure 6 and is rotatable about an axis substantially parallel with the axis of rotation of the transmission output shaft 4b. The reduction gear 12 is held in mesh with the above mentioned transmission output gear 11 and is formed with an axial bore defined by an internally serrated inner peripheral wall 12a (FIG. 1B) which is substantially coaxial with the gear 12 as a whole. The speed reduction gear 12 is larger in diameter and accordingly in number of teeth than the transmission output gear 11 and is thus adapted to rotate at a speed lower in a ratio determined by the ratio between the numbers of teeth of the gears 11 and 12 and the transmission output gear 11.

The transaxle mechanism 2 further comprises first and second planetary gear assemblies 13 and 14 which are also enclosed within the transaxle casing structure 6 and which are positioned in series intermediate between the front final reduction gear unit 5 and the above described speed reduction gear 12.

The first planetary gear assembly 13 is positioned closer to the speed reduction gear 12 and comprises an externally toothed sun gear 13a, an internally toothed ring gear 13b coaxially encircling the sun gear 13a and two or more planet pinions 13c each intervening between the sun gear 13a and the ring gear 13b. The sun gear 13a is rotatable about an axis substantially aligned with the axis of rotation of the speed reduction gear 12 and is formed with an axial bore. Each of the planet pinions 13c is rotatable about an axis substantially parallel with the axis of rotation of the sun gear 13a and is held in mesh with both of the sun gear 13a and the ring gear 13b. The planet pinions 13c are connected together by means of a pinion carrier 13d and are, thus, not only rotatable individually about their respective axes of rotation but revolvable together about the common axis of rotation of the sun gear 13a and the ring gear 13b. The ring gear 13b is rotatably supported on the transaxle casing structure 6 by means of suitable bearings as shown in FIG. 1B.

The second planetary gear assembly 14, positioned closer to the front final reduction gear unit 5 is per se constructed similarly to the first planetary gear assembly and, thus, comprises an externally toothed sun gear 14a, an internally toothed ring gear 14b coaxially encircling the sun gear 14a and two or more planet pinions 14c each intervening between the sun gear 14a and the ring gear 14b. The sun gear 14a is rotatable about an axis substantially aligned with the axis of rotation of the sun gear 13a of the first planetary gear assembly 13 and is formed with an axial bore. Each of the planet pinions 14c is rotatable about an axis substantially parallel with the axis of rotation of the sun gear 14a and is held in mesh with both of the sun gear 14a and the ring gear 14b. The planet pinions 14c are connected together by means of a pinion carrier 14d and are, thus, not only rotatable individually about their respective axes of rotation but revolvable together about the common axis of rotation of the sun gear 14a and the ring gear 14b. The ring gear 14b is rotatably supported on the transaxle casing structure 6 by means of suitable bearings as shown in FIG. 1B. The ring gear 14b is toothed not only internally but externally.

The sun gear 13a of the first planetary gear assembly 13 thus constructed has a tubular axial extension 15 formed with an axial bore having a center axis substantially coincident with the common axis of rotation of the sun and ring gears 13a and 13b. The axial extension 15 has an externally serrated leading end portion 15a axially projecting into the bore in the speed reduction gear 12 and splined to the internally serrated inner peripheral wall 12a of the gear 12. The sun gear 13a is, thus, rotatable with the speed reduction gear 12 about the common axis of rotation of the sun gear 13a and the ring gear 13b and is therefore driven to rotate about the axis of rotation thereof when a driving power is transmitted from the transmission output gear 11 to the speed reduction gear 12. In the above described arrangement of the speed reduction gear 12 and the sun gear 13a, it is important that the particular two rotatable members are constructed separately of each other and are detachably coupled together in such a manner that the members are rotatable as a single unit about the aligned respective axes of rotation thereof.

The pinion carrier 13d of the first planetary gear assembly 13 is connected to and coaxially rotatable with the pinion carrier 14d of the second planetary gear assembly 14. Thus, the driving power transmitted from the pinion carrier 13d to the pinion carrier 14d is split into two output components, one of which is transmitted through the front final reduction gear unit 5 to a pair of front road wheels 16 and 16' and the other of which is transmitted through a rear final reduction gear unit 17 to a pair of rear road wheels 18 and 18'.

The front final reduction gear unit 5 consists essentially of a differential gear assembly comprising a differential gear casing 19 which is rotatable about an axis substantially aligned with the common axis of rotation of the sun and ring gears 14a of the second planetary gear assembly 14. The gear 19 has opposite axial extensions or boss portions respectively journaled in suitable bearings supported by the tranaxle casing structure and has carried therein two pairs of differential bevel pinions 20 which are rotatably mounted on two pinion cross shafts 21 (FIG. 1B) secured to the gear casing 19 and extending at right angles to each other and to the axis of rotation of the gear casing 19, as will be seen from FIG. 1B in which only two of the four bevel pinions 20 are shown mounted on one of the cross shafts 21. The individual bevel pinions 20 are, thus, rotatable not only together with the gear casing 19 and cross shafts 21 about the axis of rotation of the gear casing 19 but also independently of one another about the center axes of the cross shafts 21, viz., axes perpendicular to the axis of rotation of the gear casing 19. The sun gear 14a of the second planetary gear assembly 14 has a tubular axial extension connected to the differential gear casing 19, which is thus rotatable about the axis of rotation thereof together with the sun gear 14a.

The four differential bevel pinions 20 intervene between and are held in mesh with a pair of differential side bevel gears 22 and 22' which are rotatable about the axis of rotation of the differential gear casing 19 and which are also carried in the gear casing 19. The side bevel gears 22 and 22' are splined to inner end portions of a pair of side gear shafts 23 and 23', respectively, extending from the gear casing 19 in a lateral direction of the vehicle chassis. One of the side gear shafts such as the side gear shaft 23 carrying the side bevel gear 22 as shown axially extends in part through the axial bore in the respective sun gears 13a and 14a of the first and second planetary gear assemblies 13 and 14 and the axial bore in the tubular extension 15 of the pinion carrier 13d of the first planetary gear assembly 13 and in part through the axial bore in the speed reduction gear 12 as will be better seen from FIG. 1B. The other side gear shaft 23' connected to the side bevel gear 22' axially extends in the opposite direction to the side gear shaft 23 outwardly from the differential gear casing 19.

The side gear shafts 23 and 23' form part of front axle assemblies which further comprise front wheel drive shafts 24 and 24' connected to the side gear shafts 23 and 23' through suitable coupling means such as constant-velocity joints 25 and 25', respectively. The front wheel drive shafts 24 and 24' in turn extend outwardly from the constant-velocity joints 25 and 25' in a lateral direction of the vehicle chassis and are connected at their outer axial ends to front wheel axles 26 and 26' for the front road wheels 16 and 16' through suitable coupling means such as constant-velocity joints 27 and 27', respectively.

The construction and arrangement of the front final reduction gear unit 5 as hereinbefore described and shown in FIGS. 1A and 1B is per se simply for the purpose of illustration and may thus be changed and/or modified in numerous manners as desired.

The sun gear 14a of the second planetary gear assembly 14 in the embodiment of FIGS. 1A and 1B thus serves as the power output member for transmitting a driving power to the front road wheels 16 and 16' through the front final reduction gear unit 5. On the other hand, the ring gear 14b of the planetary gear assembly 14 serves as the power output member for transmitting a driving power to the rear road wheels 18 and 18', through the rear final reduction gear unit 17. For this purpose, the rotation of the ring gear 14b is converted into rotation about an axis perpendicular to the axis of rotation of the ring gear 14b by means of a right-angle power transfer gear unit 28 which is enclosed within a rearward extension of the transaxle casing structure 6.

The right-angle power transfer gear unit 28 comprises a branch-off gear 29 fixedly mounted on and coaxially rotatable with an axial extension of a driving bevel gear 30 which is journaled in suitable bearings on the rearward extension of the casing structure 6 and which is rotatable about an axis substantially parallel with the axis of rotation of the ring gear 14b. The branch-off gear 29 is held in mesh with the ring gear 14b and is, thus, driven for rotation together with the driving bevel gear 30 about the axis of rotation of the bevel gear 30 when the ring gear 14b is driven by the pinion carrier 14d about the axis of rotation thereof.

The driving bevel gear 30 is held in mesh with a driven bevel gear 31 which has an axial extension journaled in suitable bearings supported on the rearward extension of the transaxle casing structure 6. The driven bevel gear 31 is rotatable about an axis extending at right angles to the axis of rotation of the driving bevel gear 30, viz., in a fore-and-aft direction of the chassis of the vehicle. It may be herein mentioned that the relationship between the axis of rotation of the driving bevel gear 30 and the axis of the rotation of the driven bevel gear 31 is such that the particular two axes of rotation are substantially at right angles to each other but are not necessarily in a perpendicularly intersecting relationship to each other.

The axial extension of the driven bevel gear 31 projects rearwardly from the rearward extension of the casing structure 6 through an opening formed in the rearward extension and is connected through suitable coupling means such as a universal joint 32 to a propeller shaft 33 extending rearwardly from the universal joint 32 in a fore-and-aft direction of the vehicle chassis as schematically shown in FIG. 1A.

The propeller shaft 33 forms part of a driveline for the rear road wheels 18 and 18' and is rearwardly connected through suitable coupling means such as a universal joint 34 to the rear final reduction gear unit 17.

As shown schematically in FIG. 1A, the rear final reduction gear unit 17 comprises a driving bevel pinion 35 connected to the above mentioned propeller shaft 33 through the universal joint 34 and having an axis of rotation in a fore-and-aft direction of the vehicle chassis. The driving bevel pinion 35 is held in mesh with a bevel ring gear 36 having an axis of rotation at right angles to the axis of rotation of the driving bevel pinion 35. The driving bevel pinion 35 and the bevel ring gear 36 constitute, in combination, right-angle power transfer gear means adapted to convert the rotation of the propeller shaft 33 about the axis of rotation thereof into rotation of the bevel ring gear 36 about an axis perpendicular, in an intersecting or a non-intersecting relationship, to the axis of rotation of the propeller shaft 33. Such bevel gears 35 and 36 are housed in a stationary gear casing 36 and are each journaled in suitable bearings (not shown) supported on the gear casing 37.

Similarly to the previously described front final reduction gear unit 5, the rear final reduction gear unit 17 consists of a differential gear assembly and, thus, further comprises a rotatable gear casing (not shown) which is secured to or intergral with the above mentioned bevel ring gear 36. The gear casing is rotatable with the ring gear 36 about the center axis thereof with respect to the above mentioned stationary gear casing 37 and has carried therein two pairs of differential bevel pinions 38 which are rotatably mounted on two pinion cross shafts (not shown) secured to the rotatable gear casing. The bevel pinions 38 are thus rotatable not only together with the cross shafts and the rotatable gear casing about the axis of rotation of the ring gear 36 but also independently of one another about the center axes of the cross shafts, viz., axes perpendicular to the axis of rotation of the ring gear 36.

The differential bevel pinions 38 intervene between and are held in mesh with a pair of differential side bevel gears 39 and 39' which are rotatable about the axis of rotation of the ring gear 36 and which are also carried in the above mentioned rotatable gear casing. The side bevel gears 39 and 39' are splined to inner end portions of a pair of side gear shafts 40 and 40', respectively, which extend from the stationary gear casing 37 in a lateral direction of the vehicle chassis through openings in opposite side wall portions of the gear casing 37. The side gear shaft 40 and 40' form part of rear axle assemblies which further comprise rear wheel drive shafts 41 and 41' connected to the side gear shafts 40 and 40' through suitable coupling means such as constant-velocity joints 42 and 42', respectively. The rear wheel drive shafts 41 and 41' in turn extend outwardly from the constant-velocity joints 42 and 42' in a lateral direction of the vehicle chassis and are connected at their outer axial ends to rear wheel axles 43 and 43' of the rear road wheels 18 and 18' through suitable coupling means such as constant-velocity joints 44 and 44', respectively.

The construction and arrangement of the rear final reduction gear unit 17 as hereinbefore described and shown in FIG. 1A is per se simply by way of example and may therefore be changed and/or modified in numerous manners as desired.

As will be seen from FIG. 1B. the transaxle casing structure 6 of the four-wheel-drive system constructed and arranged as hereinbefore described comprises a clutch housing portion 6a having the clutch unit 3 and the speed reduction gear 12 enclosed therein, a transmission gear housing portion 6b having the transmission gear unit 4 enclosed therein, and a power transfer gear housing portion 6c having the front final reduction gear unit 5 and the first and second planetary gear assemblies 13 and 14 enclosed therein. The power transfer gear housing portion 6c is constructed separately of the clutch and transmission gear housing portion 6a and 6b and is detachably connected to the clutch housing portion 6a by suitable fastening means (not shown) preferably in the neighborhood of the coupling between the speed reduction gear 12 and the pinion carrier 13d of the first planetary gear assembly 13 or more specifically the axial extension 15 of the pinion carrier 13d positioned within the housing portion 6c.

The four-wheel-drive system embodying the present invention as shown in FIGS. 1A and 1B of the drawings further comprises a low-high speed shifting clutch mechanism 45 which is adapted to provide coupling selectively between the speed reduction gear 12 and the first planetary gear assembly 13 and between the first planetary gear assembly 13 and a suitable stationary member as schematically indicated at 46 in FIG. 1A. As will be seen from the illustration of FIG. 1B, such a stationary member is herein assumed, by way of example, as being securely attached to the above mentioned power transfer gear housing portion 6c of the transaxle casing structure 6.

The low-high speed shifting clutch mechanism 45 comprises externally toothed or serrated first, second and third speed-shift clutch gears 47, 48 and 48 which are axially arranged in series with the second speed-shift clutch gear 48 positioned intermediate between the first and third clutch gears 47 and 49. The first speed-shift clutch gear 47 is fixedly mounted on the axial extension 12a of the speed reduction gear 12 and is thus coaxially rotatable with the speed reduction gear 12 and accordingly further with the sun gear 13a of the first planetary gear assembly 13. The speed-shift second clutch gear 48 is fixedly mounted on or integral with a hollow connecting member 50 which is securely connected to or integral with the ring gear 13b of the first planetary gear assembly 13. The second speed-shift clutch gear 48 is thus coaxially rotatable with the ring gear 13b through the hollow connecting member 50 which is arranged in a coaxially surrounding relationship to an axial portion of the extension 15a of the sun gear 13a. On the other hand, the third speed-shift clutch gear 49 is fixedly connected to or integral with the above mentioned stationary member 46 securely attached to the power transfer gear housing portion 6c. The third speed-shift clutch gear 49 is therefore fixed with respect to the transaxle casing structure 6. The first, second and third speed-shift clutch gears 47, 48 and 48 thus arranged are axially spaced apart from each other and have substantially equal diameters.

The low-high speed shifting clutch mechanism 45 further comprises an internally toothed or serrated annular coupling sleeve 51 which is constantly held in mesh with the second speed-shift clutch gear 48 arranged between the first and third speed-shift clutch gears 47 and 49. The coupling sleeve 51 is axially movable selectively into and out of a first axial position in mesh with not only the second speed-shift clutch gear 47 but the rotatable first speed-shift clutch gear 47 as schematically shown in FIG. 1A and a second axial position in mesh with not only the second speed-shift clutch gear 48 but the fixed third speed-shift clutch gear 49 though not shown in the drawings. The coupling sleeve 51 is externally formed with a circumferential groove through which a clutch actuating fork (not shown) is held in a circumferentially slidable engagement with the coupling sleeve 51. The clutch actuating fork thus engaging the coupling sleeve 51 is in turn connected through a suitable mechanical linkage to suitable manually or otherwise operated low-high speed shift control means, though not shown in the drawings.

The sun gear 13a and the ring gear 13b of the first planetrary gear assembly 13 are thus connected to and rotatable with the first and second speed-shift clutch gears 47 and 48, respectively, of the low-high speed shifting clutch mechanism 45. The pinion carrier 13d of the first planetary gear assembly 13 is securely connected to or integral with the pinion carrier 14d of the second planetary gear assembly 14, the pinion carriers 13d and 14d being thus rotatable together about aligned axes of rotation which are substantially coincident with the axis of rotation of the previously mentioned side gear shaft 23. On the other hand, the sun gear 14a of the second planetary gear assembly 14 has a tubular axial extension connected to or integral with the differential gear casing 19 of the front final reduction gear unit 5, the gear casing 19 thus being rotatable with the sun gear 14a about the axis of rotation of the axial extension of the sun gear 14a. The ring gear 14b of the second planetary gear assembly 14 is externally held in mesh with the branch-off gear 29 of the previously described right-angle power transfer gear unit 28.

Description will be hereinafter made regarding the operation of the vehicle driving system constructed and arranged as hereinbefore described with reference to FIGS. 1A and 1B.

When the engine 1 is in operation and the clutch unit 3 is in a coupled condition, the driving power delivered from the output shaft 1a of the engine 1 is transmitted through the clutch unit 3 to the input shaft 4a of the power transmission gear unit 4. Before the clutch unit 3 is actuated into the coupled condition, the transmission gearshift lever (not shown) is manually operated to select the gearshift control rod or rail carrying the shifter fork engaging the synchronizing clutch assembly 10a, 10b or 10c to be put into motion on the transmission output shaft 4b if it is desired to select one of the forward-drive gear ratios. Further manipulation of the gear-shift lever causes the particular gearshift control rod or rail to move axially with the shifter fork carried thereon and causes the associated synchronizing clutch assembly to axially move on the transmission output shaft 4b in a direction to produce synchronized coupling between the transmission output shaft 4b and the selected one of the gears 8a to 8e on the shaft 4b. If, on the other hand, it is desired to select the reverse-drive gear ratio, the reverse idler gear 9 is actuated to axially move on the idler gear shaft 4c into the position meshing with the reverse drive gear 7f and the reverse driven gear 8f on the shafts 4a and 4b, respectively.

When one of the gears 8a to 8e on the transmission output shaft 4b is coupled to the shaft 4b through the associated synchronizing clutch 10a, 10b or 10c or the reverse idler gear 9 is moved into mesh with the gears 7f and 8f, the driving power carried through the clutch unit 3 to the transmission input shaft 4a is transmitted to the transmission output shaft 4b through the selected pair of gears on the shafts 4a and 4b or through the gears 7f, 8f and 9. The rotation of the transmission output shaft 4b thus driven for rotation at a speed proportioned in the selected ratio to the rotational speed of the transmission input shaft 4a is transmitted through the transmission output gear 11 on the shaft 4b to the speed reduction gear 12 and is reduced in speed with a ratio determined by the ratio between the numbers of teeth of the transmission output gear 11 and the speed reduction gear 12. The rotation of the speed reduction gear 12 in turn is transmitted to the sun gear 13a of the first planetary gear assembly 13 through the coupling between the axial extension of the speed reduction gear 12 and the axial extension 15 of the sun gear 13a and causes the sun gear 13a to rotate about the common axis of rotation of the sun and ring gears 13a and 13b of the planetary gear assembly 13.

If, in this instance, the low-high speed shifting clutch mechanism 45 is held in a condition having the coupling sleeve 51 moved into the first axial position thereof in mesh with both of the first and second speed-shift clutch gears 47 and 48 as shown in FIG. 1A, the driving power transmitted to the speed reduction gear 12 is imparted not only to the sun gear 13a of the first planetary gear assembly 13 as above discussed but to the ring gear 13b of the planetary gear assembly 13 through the first speed-shift clutch gear 47, coupling sleeve 51, second speed-shift clutch gear 48 and connecting member 50. As a consequence, both of the sun and ring gears 13a and 13b of the first planetary gear assembly 13 are driven to rotate at equal speeds about the common center axis of the gears 13a and 13b with the result that all the rotatable members of the first planetary gear assembly 13 are caused to rotate as a single unit about the common axis of rotation of the gears 13a and 13b. It therefore follows that the driving power transmitted to the speed reduction gear 12 is transmitted without reduction in speed of rotation to the pinion carrier 13d of the first planetary gear assembly 13 and further through the pinion carrier 13d to the pinion carrier 14d of the second planetary gear assembly 14 and thereby causes the pinion carrier 14d to rotate with the planet pinions 14c about the common axis of rotation of the sun gear 14a and ring gear 14b of the second planetary gear assembly 14.

If, on the other hand, the low-high speed shifting clutch mechanism 45 is maintained in a condition having the coupling sleeve 51 held in the second axial position thereof in mesh with the second and third speed-shift clutch gears 48 and 49, the ring gear 13a of the first planetary gear assembly 13 is fixed with respect to the transaxle casing structure 6 through the second speed-shift clutch gear 48, coupling sleeve 51, third speed-shift clutch gear 49 and stationary member 46, and thus, serves as a reaction member in the planetary gear assembly 13. Under these conditions, the rotation of the speed reduction gear 12 rotating with the sun gear 13a is transmitted to the pinion carrier 13d of the first planetary gear assembly 13 and accordingly to the pinion carrier 14d of the second planetary gear assembly with reduction in speed at a ratio expressed as Ns/(Ns+Nr) where Ns stands for the number of the teeth of the sun gear 13a and Nr is representative of the number of the teeth of the ring gear 13b.

Driving power is thus transmitted from the speed reduction gear 12 to the pinion carrier 14d of the second planetary gear assembly 14 without or with reduction in speed of rotation with the coupling sleeve 51 in the first or second axial position, respectively, thereof.

The driving power transmitted to the pinion carrier 14d of the second planetary gear assembly 14 as hereinbefore discussed is split into two output components respectively driving the sun gear 14a and the ring gear 14b for rotation about the common axis of rotation thereof. The planetary gear assembly 14 thus functions as a differential unit and is operative to adjust the differential speed of rotation between the sun gear 14a for driving the front road wheels 16 and 16' and the ring gear 14b for driving the rear road wheels 18 and 18'.

The driving power transmitted from the pinion carrier 14d to the sun gear 14a of the planetary gear assembly 14 is transmitted to the differential gear casing 19 of the front final reduction gear unit 5 and through the gear casing 19 and the cross shafts 21 to the differential bevel pinions 20. The differential bevel pinions 20 in turn drive the differential side bevel gears 22 and 22' for rotation with respect to the gear casing 19. Thus, the driving power transmitted to the front final reduction gear unit 5 is split into two output components. The two output components are respectively transmitted through the side gear shafts 23 and 23', constant-velocity joints 25 and 25', front wheel drive shafts 24 and 24', constant-velocity joints 27 and 27' and front wheel axles 26 and 26' to the front road wheels 16 and 16', respectively.

On the other hand, the driving power transmitted from the pinion carrier 14d to the ring gear 14b of the second planetary gear assembly 14 is transmitted to the branch-off gear 29 and further through the branch-off gear 29 to the driving bevel gear 30 of the right-angle power transfer gear unit 28, causing the driven bevel gear 31 of the unit 28 to turn about its axis of rotation in a fore-and-aft direction of the vehicle chassis. The rotation of the driven bevel gear 31 in turn is transmitted by way of the universal joint 32, propeller shaft 33 and universal coupling 34 to the driving bevel pinion 35 and further through the bevel pinion 35 to the bevel ring gear 36 of the rear final reduction gear unit 17 shown in FIG. 1B. The driving power thus transmitted to the rear final reduction gear unit 17 is transmitted through the rotatable differential gear casing and the cross shafts (not shown) of the gear unit 17 to the differential bevel pinions 38. The differential bevel pinions 38 in turn drive the differential side bevel gears 39 and 39' for rotation with respect to the rotatable differential gear casing. The driving power transmitted to the rear final reduction gear unit 17 is thus split into two output components and reduced in speed by means of the gear unit 17. The two split components of the driving power are transmitted through the side gear shafts 40 and 40', constant-velocity joints 42 and 42', rear wheel drive shafts 41 and 41', constant-velocity joints 44 and 44' and rear wheel axles 43 and 43' to the rear road wheels 18 and 18', respectively.

Figure 2A:
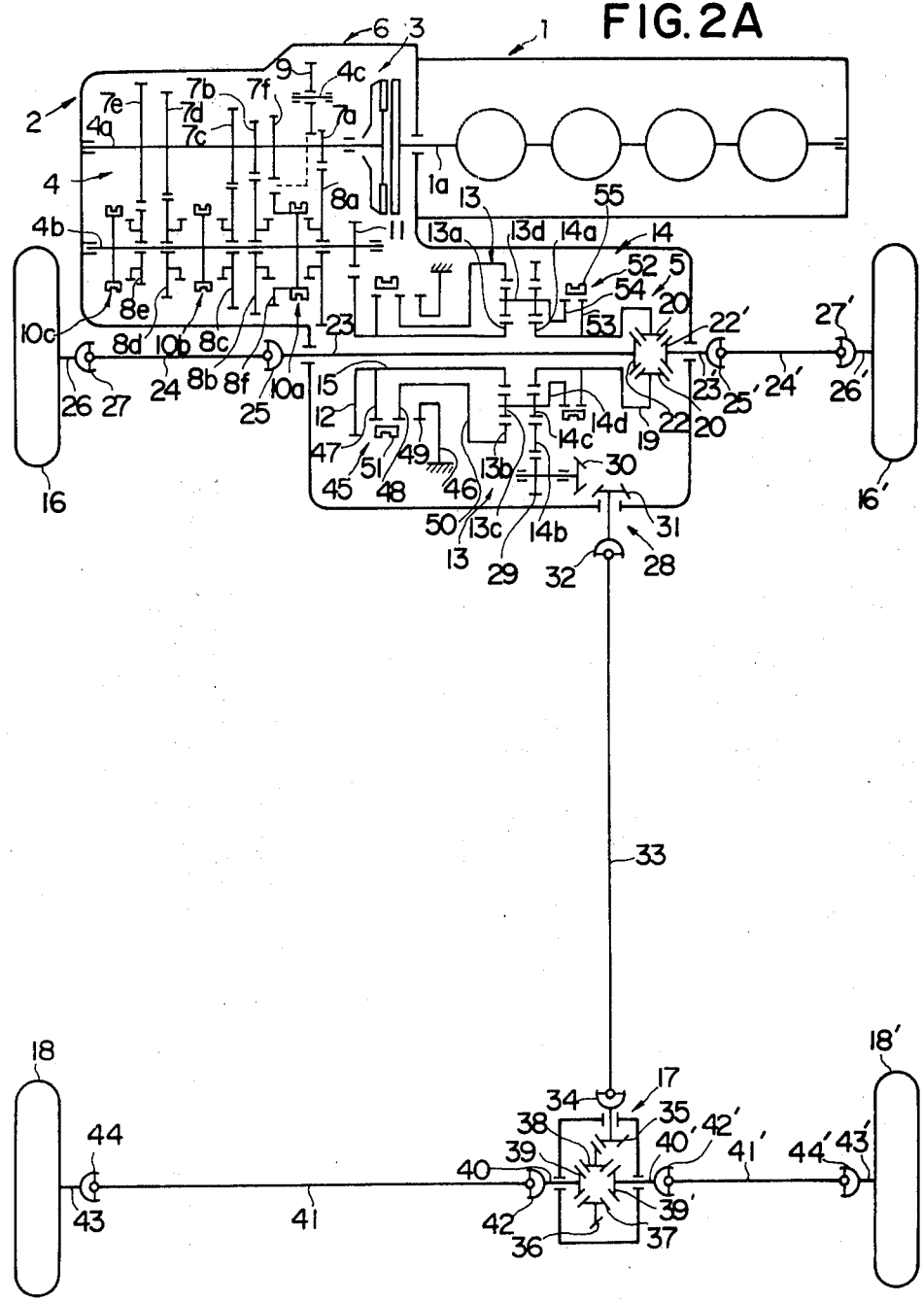
FIG. 2A is a schematic view showing the general construction of a second preferred embodiment of the four-wheel-drive system according to the present invention.

Turning to FIGS. 2A and 2B of the drawings, the embodiment herein shown is a modification of the embodiment hereinbefore described with reference to FIGS. 1A and 1B and is characterized by the provision of a lock-up clutch mechanism 52 which is adapted to have the sun gear 14a of the second planetary gear assembly 14 locked up to the pinion carrier 14d and to thereby neutralize the differential action of the second planetary gear assembly 14 when desired.

Such a lock-up clutch 52 comprises an externally serrated first lock-up clutch gear 53 coaxially rotatable with the previously mentioned tubular axial extension of the sun gear 14a and an externally serrated second lock-up clutch gear 54 rotatable with the pinion carrier 14d about the axis of rotation of the sun gear 14a. The first lock-up clutch gear 53 may be securely connected to the tubular axial extension of the sun gear 14a and the second lock-up clutch gear 54 may be integral with the pinion carrier 14d and may be rotatably carried on the extension of the sun gear 14a. The first and second lock-up clutch gears 53 and 54 are axially spaced apart from each other and have equal diameters. The lock-up clutch mechanism 52 further comprises an internally serrated annular coupling sleeve 55 which is constantly held in mesh with one of the first and second lock-up clutch gears such as the first lock-up clutch gear 53 as shown in FIG. 2B and is axially movable into and out of mesh with the other of the lock-up clutch gears such as the second lock-up clutch gear 54 as shown. The coupling sleeve 55 is externally formed with a circumferential groove through which a clutch actuating fork (not shown) is held in a circumferentially slidable engagement with the coupling sleeve 55. The clutch actuating fork thus engaging the coupling sleeve 55 in turn is connected through a suitable mechanical linkage to suitable manually or otherwise operated lock-up control means, though not shown in the drawings.

The embodiment of the four-wheel-drive system shown in FIGS. 2A and 2B is in other respects entirely similar to the embodiment of FIGS. 1A and 1B and, for this reason, further description regarding the construction and arrangement of the embodiment of FIGS. 2A and 2B will not be herein incorporated.

When, now, the lock-up clutch mechanism 52 constructed and arranged as above described is maintained in an uncoupled condition with the coupling sleeve 55 held in mesh with the first lock-up clutch gear 53 alone, the sun gear 14a and the pinion carrier 14d of the second planetary gear assembly 14 are permitted to turn independently of each other about the common axis of rotation of the sun and ring gears 14a and 14b. Under this condition, the second planetary gear assembly 14 behaves similarly to its counterpart in the embodiment of FIGS. 1A and 1B and is, thus, enabled to under-take a differential gear action, permitting the front and rear road wheels to rotate at different speeds.

When, on the other hand, the lock-up clutch mechanism 52 is brought into a coupled condition with the coupling sleeve 55 moved into the axial position bridging both of the first and second lock-up clutch gears 53 and 54, the sun gear 14a and the pinion carrier 14d of the second planetary gear assembly 14 are locked up together through the clutch mechanism 52. The sun gear 14a and the pinion carrier 14d are therefore caused to rotate as a single unit about the common axis of rotation of the sun gear 14a and the ring gear 14b so that the second planetary gear assembly 14 as a whole is prohibited from acting as a differential gear unit. If, thus, the clutch mechanism 52 is actuated to couple when the vehicle is travelling on, for example, an icy or muddy road and one of the driven road wheels is attemtping to race, the driving power transmitted from the speed reduction gear 12 to the second planetary gear assembly 14 through the first planetary gear assembly 13 with the previously described low-high speed shifting mechanism 45 in the coupled or uncoupled condition thereof is split into substantially equalized two output components and is prevented from being totally transmitted to the particular road wheel attempting to race. The output component of the driving power distributed from the pinion carrier 14d to the sun gear 14a locked up to the pinion carrier 14d is transmitted through the front final reduction gear unit 5 to the front road wheels 16 and 16'. Likewise, the output component of the driving power distributed from the pinion carrier 14d to the ring gear 14b is transmitted through the right-angle power transfer gear unit 28, propeller shaft 33 and the rear final reduction gear unit 17 to the rear road wheels 18 and 18'.

Figure 3A:
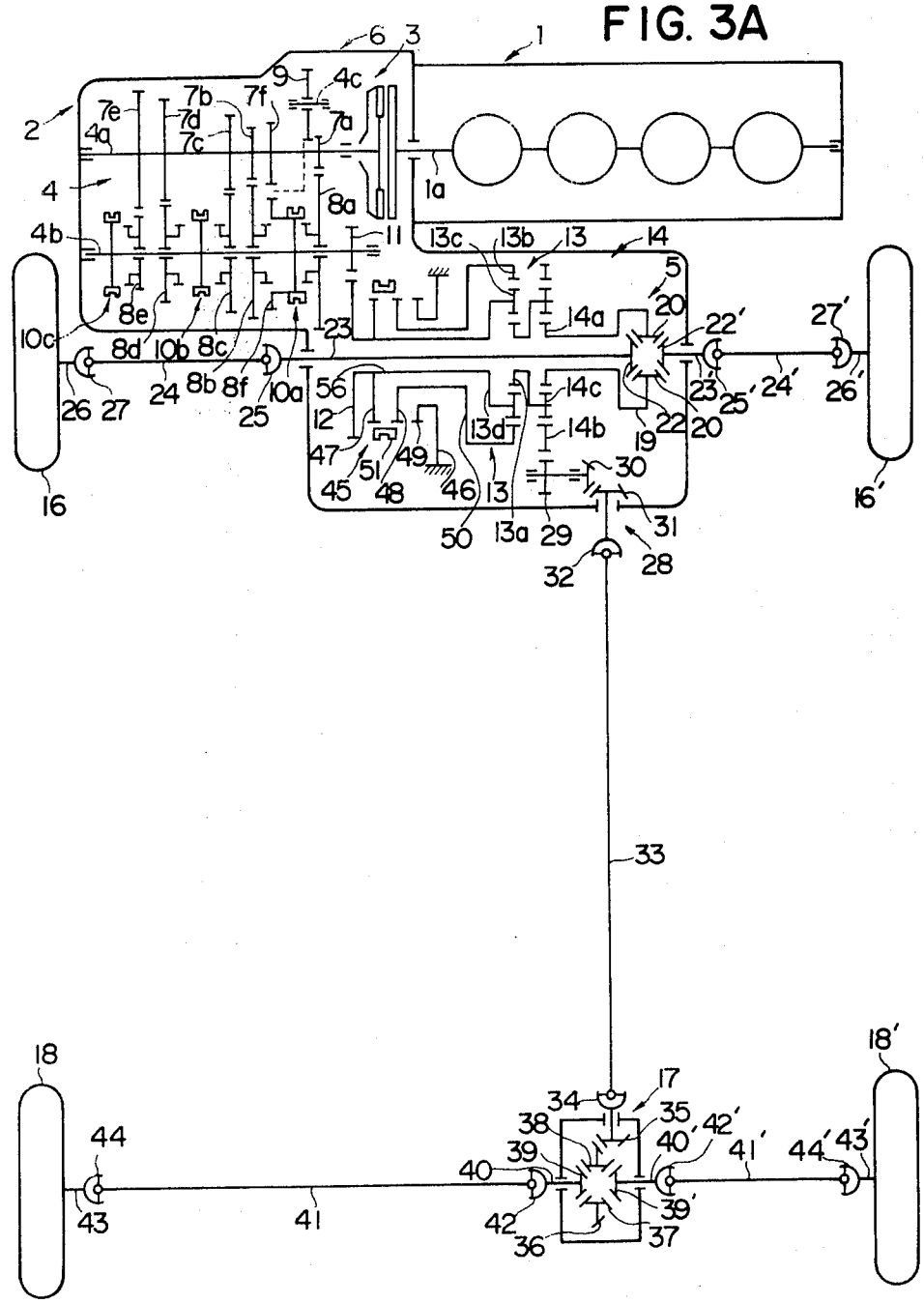
FIG. 3A is a schematic view showing the general construction of a third preferred embodiment of the four-wheel-drive system according to the present invention.

The first planetary gear assembly 13 in each of the embodiments hereinbefore described is arranged so that the sun gear 13a and the pinion carrier 13d thereof serve as power input and output members, respectively of the planetary gear assembly 13. Such an arrangement can however by readily modified so that the sun gear 13a and the pinion carrier 13d conversely serve as power output and input members, respectively, in the planetary gear assembly 13 with the ring gear 13b arranged similarly to its counterpart in each of the embodiment of FIGS. 1A and 1B and the embodiment of FIGS. 2A and 2B. FIGS. 3A and 3B show such a modified embodiment of the four-wheel-drive system according to the present invention.

In the embodiment illustrated in FIGS. 3A and 3B, the pinion carrier 13d of the first planetary gear assembly 13 has a tubular axial extension 56 formed with an axial bore having a center axis substantially coincident with the common axis of rotation of the sun gear 13a and ring gear 13b of the planetary gear assembly 13. The axial extension 56 has an externally serrated leading end portion 56a axially projecting into the bore in the speed reduction gear 12 and splined to the internally serrated inner peripheral wall 12a of the gear 12. The first speed-shift clutch gear 47 of the low-high speed shifting clutch mechanism 45 is securedly mounted on or integral with the axial extension 56 of the pinion carrier 13d. Thus, the pinion carrier 13d and the speed-shift clutch gear 47 are coaxially rotatable with the speed reduction gear 12 about the center axis of the axial extension 56 of the pinion carrier 13d. The second speed-shift clutch gear 48 of the low-high speed shifting clutch mechanism 45 is connected to or integral with the ring gear 13b of the first planetary gear assembly 13 through the hollow connecting member 50 and is thus rotatable with the ring gear 13b as in each of the embodiment of FIGS. 1A and 1B and the embodiment of FIGS. 2A and 2B.

Furthermore, the first planetary gear assembly 13 in the embodiment of FIGS. 3A and 3B has its sun gear 13a connected to or otherwise engaged by the pinion carrier 14d of the second planetary gear assembly 14 and is thus coaxially rotatable with the pinion carrier 14d. The sun gear 14a of the second planetary gear assembly 14 has a tubular axial extension connected to the differential gear casing 19 of the front final reduction gear unit 5, the gear casing 19 being thus rotatable about the axis of rotation thereof together with the sun gear 14a. On the other hand, the ring gear 14b of the second planetary gear assembly 14 is externally held in mesh with the branch-off gear 29 of the right-angle power transfer gear unit 28. The branch-off gear 29 is, thus, driven for rotation together with the driving bevel gear 30 of the power transfer gear unit 28 about the axis of rotation of the bevel gear 30 when the ring gear 14b is driven by the pinion carrier 14d of the second planetary gear assembly 14. The side gear shaft 23 carrying the side bevel gear 22 of the front final reduction gear unit 5 axially extends in part through the axial bore in the tubular extension of the sun gear 14a of the second planetary gear assembly 14, in part through the axial bore in the tubular extension 56 of the pinion carrier 13d of the first planetary gear assembly 13 and further in part through the axial bore in the tubular extension of the speed reduction gear 12 as will be better seen from FIG. 3B.

The embodiment of the four-wheel-drive system shown in FIGS. 3A and 3B is in other respects entirely similar to the embodiment of FIGS. 1A and 1B and, for this reason, further description regarding the construction and arrangement of the embodiment of FIGS. 3A and 3B will not be herein incorporated.

In operation, the driving power transmitted from the transmission output gear 11 of the power transmission gear unit 4 is transmitted to the pinion carrier 13d of the first planetary gear assembly 13 through the coupling between the axial extension of the speed reduction gear 12 and the axial extension 56 of the pinion carrier 13d and causes the pinion carrier 13d to rotate about the common axis of rotation of the sun and ring gear 13a and 13b of the planetary gear assembly 13.

If, in this instance, the low-high speed shifting clutch mechanism 45 is held in a condition having the coupling sleeve 51 moved into the first axial position thereof in mesh with both of the first and second speed-shift clutch gears 47 and 48 as shown in FIG. 3A, the driving power transmitted to the speed reduction gear 12 is imparted not only to the pinion carrier 13d of the first planetary gear assembly 13 as above discussed but to the ring gear 13b of the planetary gear assembly 13 through the first speed-shift clutch gear 47, coupling sleeve 51, second speed-shift clutch gear 48 and connecting member 50. As a consequence, both of the pinion carrier 13d and ring gear 13b of the first planetary gear assembly 13 are driven to rotate at equal speeds about the common center axis of the gears 13a and 13b with the result that all the rotatable members of the first planetary gear assembly 13 are caused to rotate as a single unit about the common axis of rotation of the gears 13a and 13b. It therefore follows that the driving power transmitted to the speed reduction gear 12 is transmitted without reduction in speed of rotation to the sun gear 13a of the first planetary gear assembly 13 and further through the sun gear 13a to the pinion carrier 14d of the second planetary gear assembly 14 and thereby causes the pinion carrier 14d to rotate with the planet pinions 14c about the common axis of rotation of the sun gear 14a and ring gear 14b of the second planetary gear assembly 14.

If, on the other hand, the low-high speed shifting clutch mechanism 45 is maintained in a condition having the coupling sleeve 51 held in the second axial position thereof in mesh with the second and third speed-shift clutch gears 48 and 49, the ring gear 13a of the first planetary gear assembly 13 is fixed with respect to the transaxle casing structure 6 through the second speed-shift clutch gear 48, coupling sleeve 51, third speed-shift clutch gear 49 and stationary member 46, and thus, serves as a reaction member in the planetary gear assembly 13. Under these conditions, the rotation of the speed reduction gear 12 rotating with the pinion carrier 13d is transmitted to the sun gear 13a of the first planetary gear assembly 13 and accordingly to the pinion carrier 14d of the second planetary gear assembly with multiplication speed at a ratio expressed as (Ns+Nr)/Ns where Ns and Nr stand for the respective numbers of the teeth of the sun gear 13a and ring gear 13b, as previously noted.

Driving power is thus transmitted from the speed reduction gear 12 to the pinion carrier 14d of the second planetary gear assembly 14 without or with multiplication in speed of rotation with the coupling sleeve 51 in the first or second axial position, respectively, thereof.

It will be apparent that the embodiment of the four-wheel-drive system according to the present invention as hereinbefore described with reference to FIGS. 3A and 3B can also be modified to have incorporated therein a lock-up clutch mechanism similar to the lock-up clutch mechanism 45 in the embodiment of FIGS. 2A and 2B.

The second planetary gear assembly 14 in each of the embodiments hereinbefore described is used in such a manner as to distribute an input driving power to the front road wheels 16 and 16' through the sun gear 14a and to the rear road wheels 18 and 18' through the ring gear 14b of the gear assembly 14. The second planetary gear assembly provided in the four-wheel-drive system according to the present invention can however be used not only in this manner but in such a manner as to distribute an input driving power to the front road wheels 16 and 16' through the ring gear 14b and to the rear road wheels 18 and 18' through the sun gear 14a of the planetary gear assembly 14. The embodiment illustrated in FIGS. 4A and 4B of the drawings is characterized by the second planetary gear assembly 14 which is utilized to realize the latter arrangement.

Figure 4A:
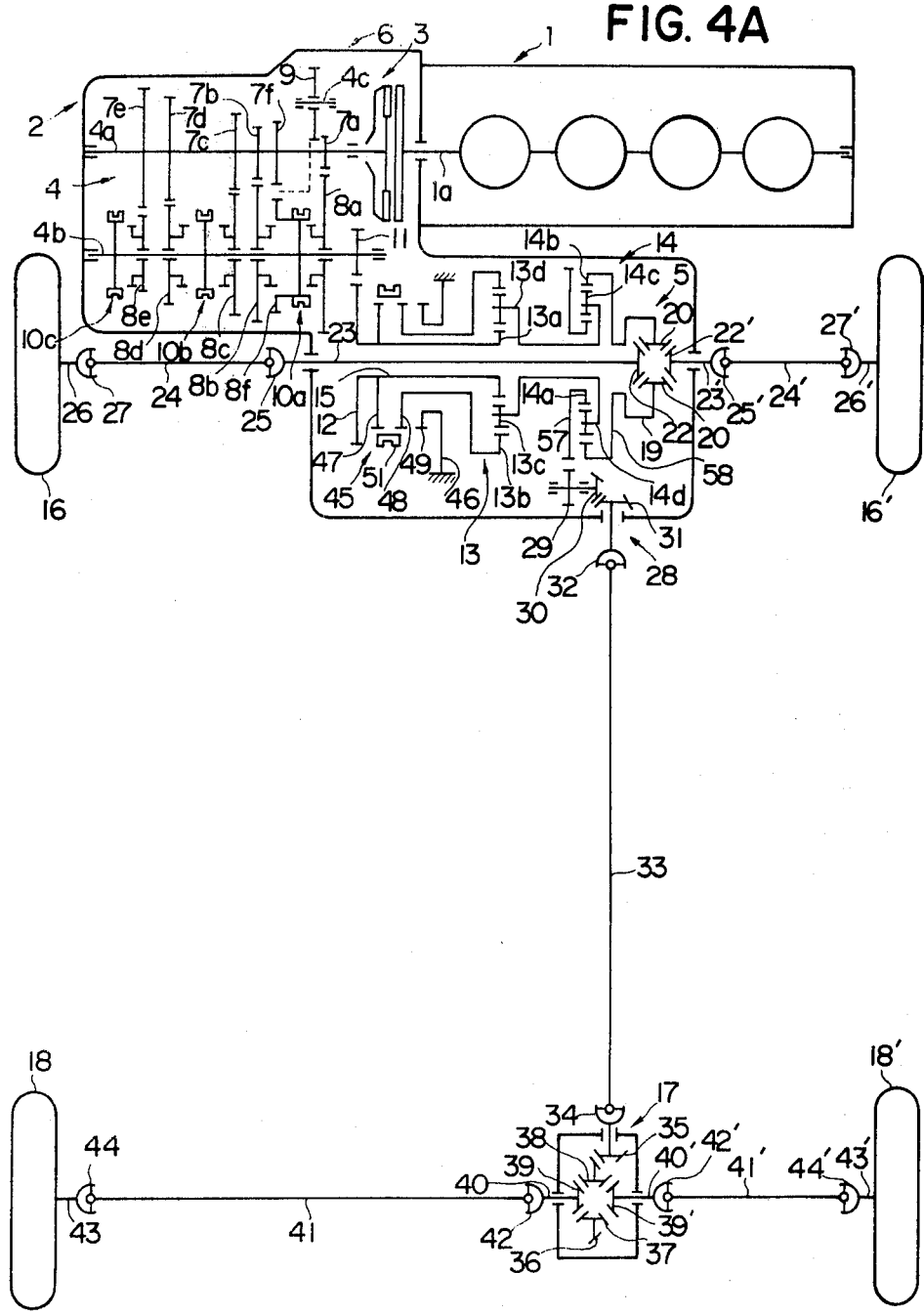
FIG. 4A is a schematic view showing the general construction of a fourth preferred embodiment of the four-wheel-drive system according to the present invention.

Referring to FIGS. 4A and 4B, the pinion carrier 13d of the first planetary gear assembly 13 has a tubular axial extension projecting through the axial bore in the sun gear 14a of the second planetary gear assembly 14. The sun gear 14a is rotatable on this axial extension of the pinion carrier 13d and has a tubular axial extension coaxially mounted and rotatable on the axial extension of the pinion carrier 13d. The axial extension of the sun gear 14a has carried thereon an externally toothed power distributor gear 57 which is coaxially rotatable with the sun gear 14a. The power distributor gear 57 is located axially intermediate between the first and second planetary gear assemblies 13 and 14 and has opposite axial extensions or boss portions respectively journaled in suitable bearings supported on the power transfer housing portion 6c of the transaxle casing structure 6. The power distributor gear 57 is held in constant mesh with the branch-off gear 29 of the right-angle power transfer unit 28. On the other hand, the pinion carrier 14d is securely connected to the axial extension of the pinion carrier 13d of the first planetary gear assembly 13. Furthermore, the ring gear 14b of the second planetary gear assembly 14 is toothed only internally and is coaxially connected to and rotatable with the rotatable differential gear casing 19 of the front final reduction gear unit 5 by means of a connecting drum 58 which is coaxially rotatable on an axial portion of the side gear shaft 23. The side gear shaft 23 axially extends in part through the connecting drum 58, in part through the axial extension of the pinion carrier 13d, in part through the axial extension of the sun gear 13a and in part through the axial extension of the speed reduction gear 12.

The four-wheel-drive system having the second planetary gear assembly 14 thus arranged is in other respects entirely similar to the embodiment of FIGS. 1A and 1B and, for this reason, no further description thereof regarding the construction and arrangement of the embodiment shown in FIGS. 4A and 4B will be herein incorporated.

In operation of the system illustrated in FIGS. 4A and 4B, the rotation of the speed reduction gear 12 driven by the transmission output shaft 11 is transmitted with or without reduction in speed to the pinion carrier 13d of the first planetary gear assembly 13 depending upon the axial position of the coupling sleeve 51 with respect to the three speed-shift clutch gears 47, 48 and 49 of the low-high-speed shifting clutch mechanism 45 as previously described in detail. The driving power thus transmitted to the pinion carrier 13d is further transmitted to the pinion carrier 14d of the second planetary gear assembly 14 through the axial extension of the pinion carrier 13d. The pinion carrier 14d is thus caused to rotate with the planet pinions 14c about the common axis of rotation of the sun gear 14a and the ring gear 14b. The driving power transmitted in this manner to the pinion carrier 14d is split into two output components respectively driving the sun gear 14a and the ring gear 14b for rotation about the common axis of rotation thereof. The second planetary gear assembly 14 is thus permitted to act as a differential gear unit automatically adjusting the differential speed of rotation between the sun and ring gear 14a and 14b thereof.

The output component of the driving power distributed from the pinion carrier 14d to the ring gear 14b of the planetary gear assembly 14 is transmitted through the connecting drum 58 to the rotatable differential gear casing 19 and accordingly to the cross shafts 21 and, through the cross shafts 21, to the differential bevel pinions 20 of the front final reduction gear unit 5. The differential bevel pinions 20 in turn drive the differential side gears 22 and 22' for rotation with respect to the differential gear casing 19. The driving power transmitted from the ring gear 14b of the planetary gear assembly 14 to the front final reduction gear unit 5 is split into two output components by the final reduction gear unit 5 and is distributed to the wheel axles 26 and 26' for the front road wheels 16 and 16' through the side gear shafts 23 and 23', constant-velocity joints 25 and 25', front wheel drive shafts 24 and 24' and constant-velocity joints 27 and 27', respectively.

On the other hand, the output component of the driving power transmitted to the sun gear 14a of the planetary gear assembly 14 is distributed through the power distributor gear 57 to the branch-off gear 29 and through the branch-off gear 29 to the driving bevel gear 30 of the right-angle power transfer unit 28. This causes the driven bevel gear 31 of the unit 28 to turn about its axis of rotation in a fore-and-aft direction of the vehicle chassis. The rotation of the driven bevel gear 31 in turn is transmitted by way of the universal joint 32, propeller shaft 33 and universal joint 34 to the rear final reduction gear unit 17 shown in FIG. 4A. The driving power thus transmitted from the sun gear 14a of the planetary gear assembly 14 to the rear final reduction gear unit 17 is split into two output components by the final reduction gear unit 17 and is distributed to the wheel axles 43 and 43' for the rear road wheels 18 and 18' through the constant-velocity joints 42 and 42', rear wheel drive shafts 41 and 41' and constant-velocity joints 44 and 44', respectively.

The embodiment of the four-wheel-drive system illustrated in FIGS. 5A and 5B of the drawings is a modification of the embodiment hereinbefore described with reference to FIGS. 4A and 4B and is characterized by the provision of a lock-up clutch mechanism 52 which is essentially similar in function to the lock-up clutch provided in the embodiment of FIGS. 2A and 2B.

Figure 5A:
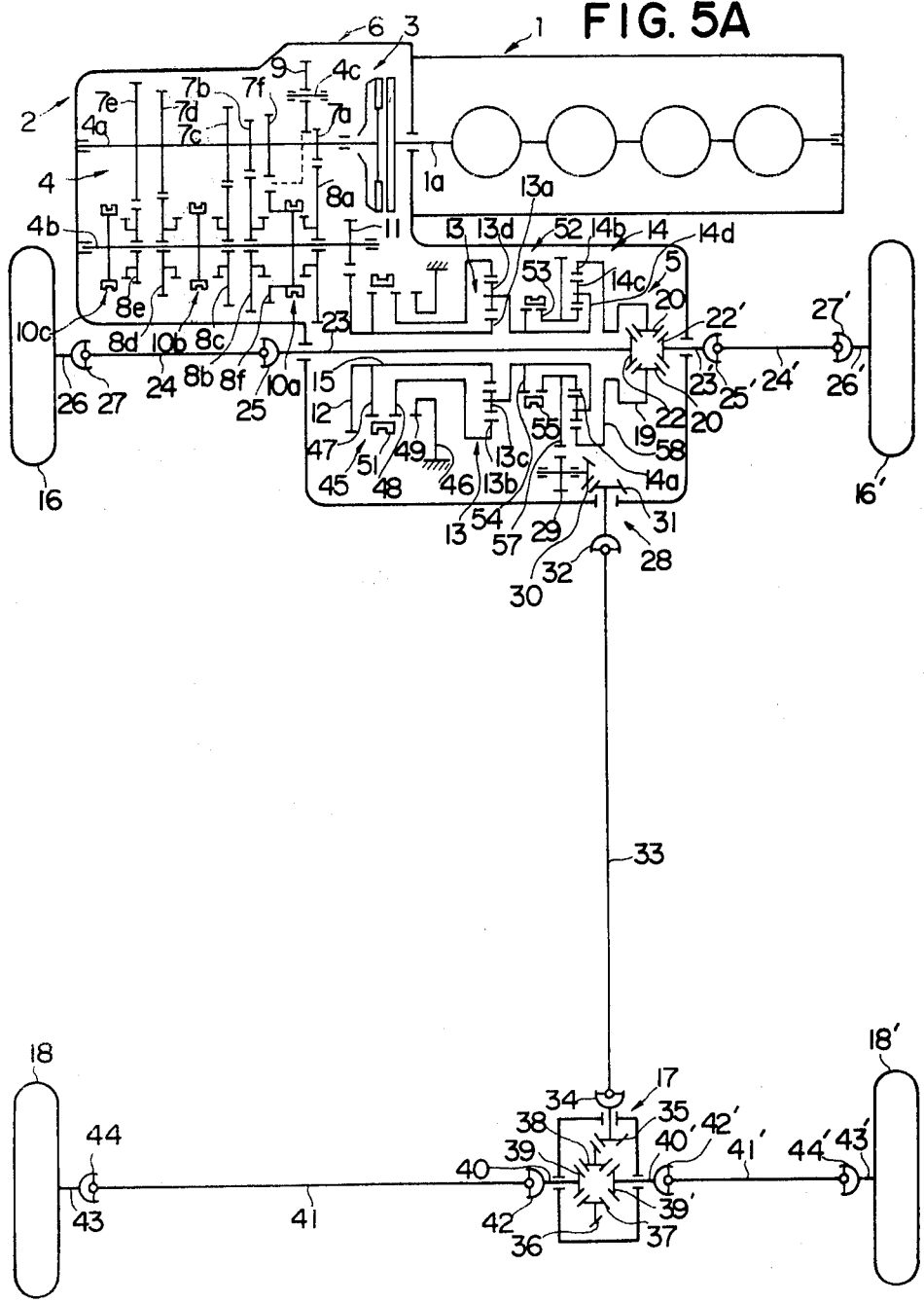
FIG. 5A is a schematic view showing the general construction of a fifth preferred embodiment of the four-wheel-drive system according to the present invention.
Figure 5B:
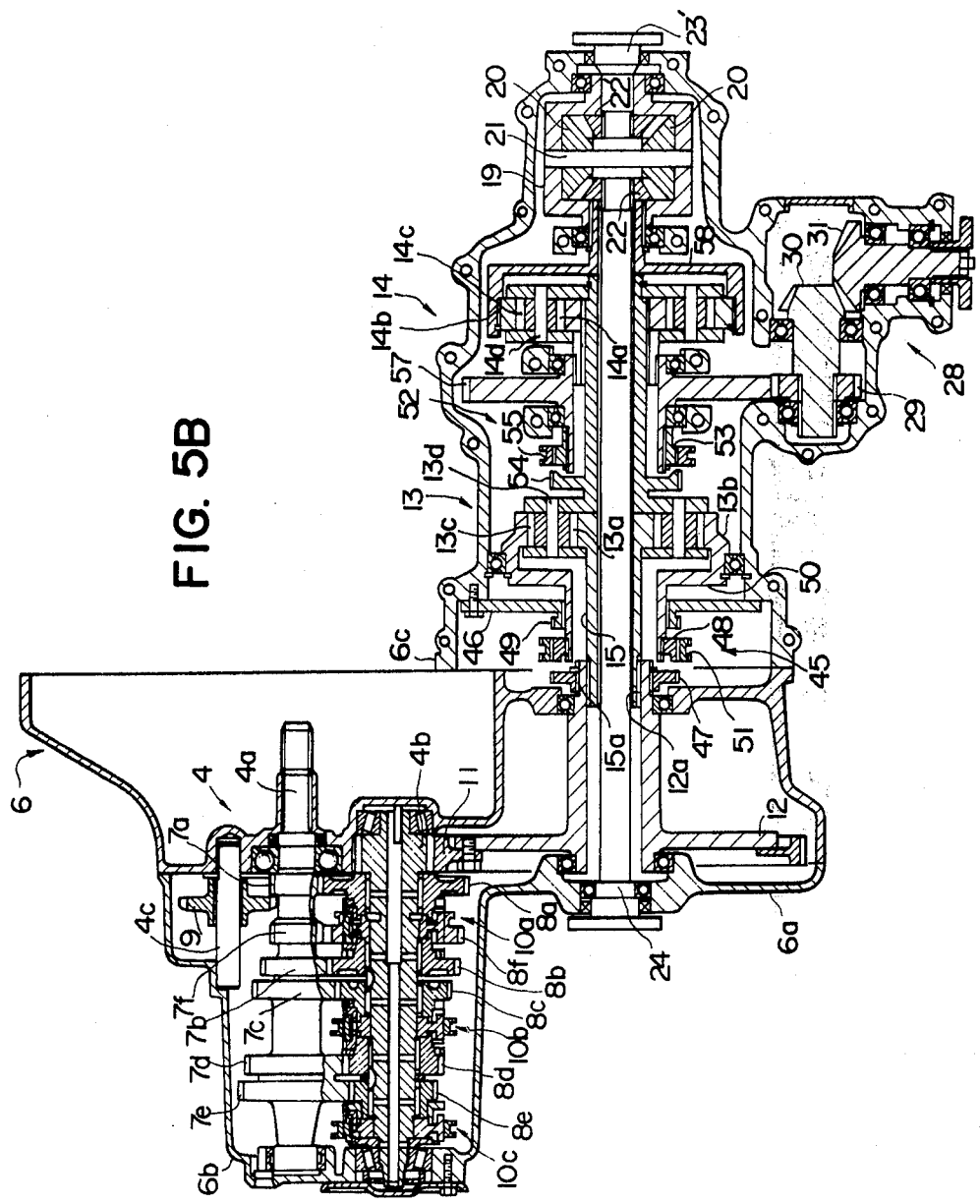
FIG. 5B is a fragmentary sectional view showing part of the detailed construction and arrangement of the embodiment illustrated in FIG. 5A.

The lock-up clutch mechanism 52 provided in the embodiment of FIGS. 5A and 5B comprises externally serrated first and second lock-up clutch gears 53 and 54. The first lock-up clutch gear 53 is coaxially mounted on and rotatable with one of the axial extensions or boss portions of the power distributor gear 57 connected to the sun gear 14a of the second planetary gear assembly 14. The second lock-up clutch gear 54 is integral or otherwise coaxially rotatable with the tubular axial extension of the pinion carrier 13d of the first planetary gear assembly 13 and is, accordingly, rotatable also with the pinion carrier 14d of the second planetary gear assembly 14. The first and second lock-up clutch gears 53 and 54 are axially spaced apart from each other and have substantially equal diameters. The lock-up clutch mechanism 52 further comprises an internally serrated annular coupling sleeve 55 which is constantly held in mesh with one of the first and second lock-up clutch gears such as the first lock-up clutch gear 53 as shown in FIG. 5B and is axially movable into and out of mesh with the other of the clutch gears such as the second lock-up clutch gear 54 as shown. The coupling sleeve 55 is externally formed with a circumferential groove through which a clutch actuating fork (not shown) is held in circumferentially slidable engagement with the coupling sleeve 55. As previously set forth in connection with the embodiment of FIGS. 2A and 2B, the clutch actuating fork thus engaging the coupling sleeve 55 in turn is connected through a suitable mechanical linkage to suitable manually or otherwise operated lock-up control means, though not shown in the drawings.

The embodiment of the four-wheel-drive system shown in FIGS. 5A and 5B is in other respects entirely similar to the embodiment of FIGS. 4A and 4B and, for this reason, further description regarding the construction and arrangement of the embodiment of FIGS. 4A and 4B will not be herein incorporated.

When, now, the lock-up clutch mechanism 52 in the embodiment of FIGS. 5A and 5B is maintained in an uncoupled condition with the coupling sleeve 55 held in mesh with the first lock-up clutch gear 53 alone as shown in FIG. 5B, the sun gear 14a and the pinion carrier 14d of the second planetary gear assembly 14 are permitted to turn independently of each other about the common axis of rotation of the sun and ring gears 14a and 14b. Under this condition, the second planetary gear assembly 14 behaves similarly to its counterpart in the embodiment of FIGS. 4A and 4B and is, thus, enabled to undertake a differential gear action, permitting the front and rear road wheels to rotate at different speeds.

When, on the other hand, the lock-up clutch mechanism 52 is brought into a coupled condition with the coupling sleeve 55 moved into the axial position bridging both of the first and second lock-up clutch gears 53 and 54, the sun gear 14a and the pinion carrier 14d of the second planetary gear assembly 14 are locked up together through the clutch mechanism 52 and the power distributor gear 57. The sun gear 14a and the pinion carrier 14d are therefore caused to rotate as a single unit about the common axis of rotation of the sun gear 14a and the ring gear 14b so that the planetary gear assembly 14 as a whole is prohibited from acting as a differential gear unit.

Figure 6A:
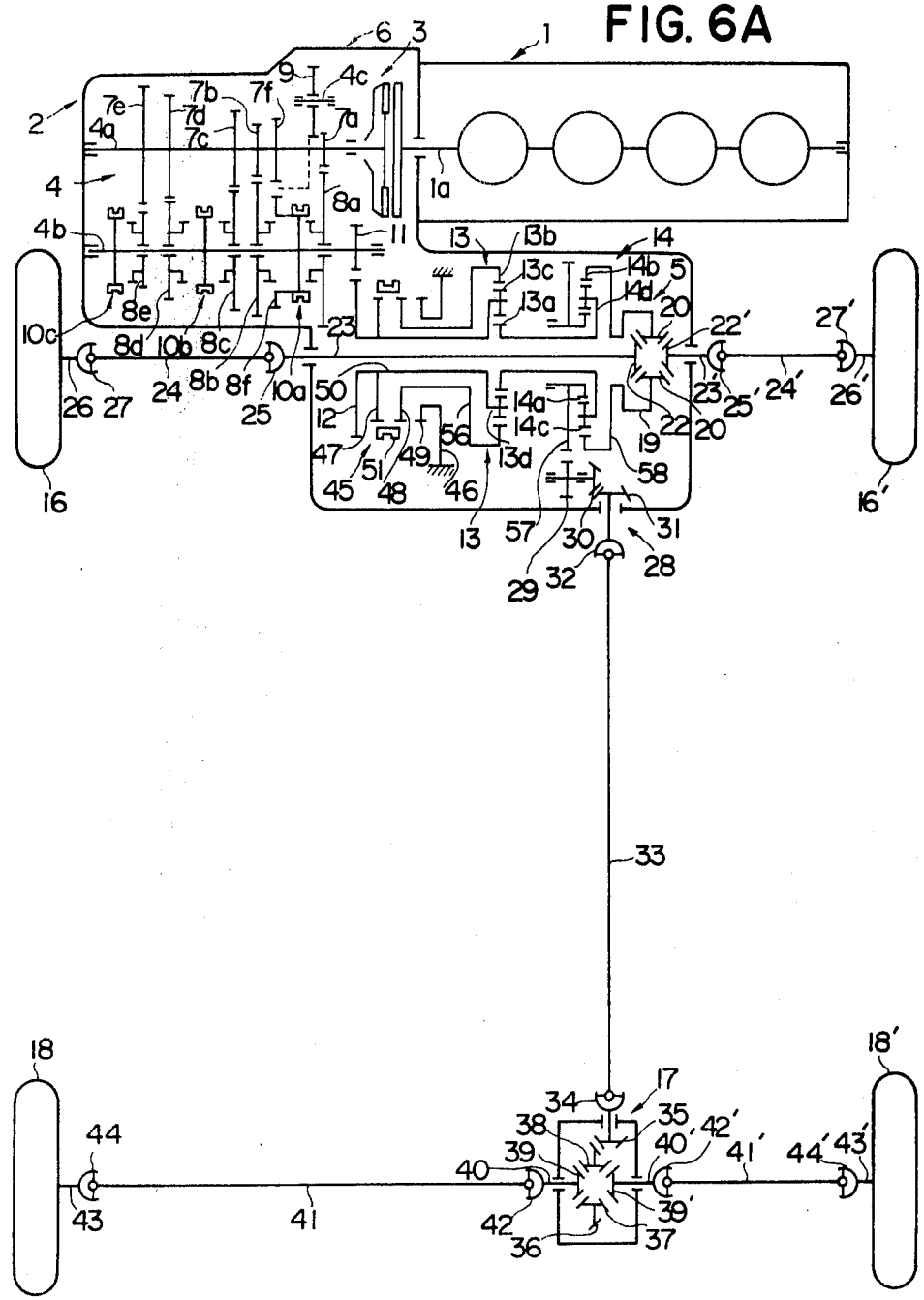
FIG. 6A is a schematic view showing the general construction of a sixth preferred embodiment of the four-wheel-drive system according to the present invention.

FIGS. 6A and 6B show another modification of the embodiment of FIGS. 4A and 4B. The modified embodiment illustrated in FIGS. 6A and 6B features the arrangement of the first planetary gear assembly 13 and the low-high speed shifting clutch mechanism 45 which are arranged similarly to those of the embodiment of FIGS. 3A and 3B.

In the embodiment illustrated in FIGS. 6A and 6B, the pinion carrier 13d of the first planetary gear assembly 13 has a tubular axial extension 56 formed with an axial bore having a center axis substantially coincident with the common axis of rotation of the sun gear 13a and ring gear 13b of the planetary gear assembly 13. The axial extension 56 has an externally serrated leading end portion 56a axially projecting into the bore in the tubular axial extension of the speed reduction gear 12 and splined to the internally serrated inner peripheral wall 12a of the gear 12. The first speed-shift clutch gear 47 of the low-high speed shifting clutch mechanism 45 is securedly mounted on or integral with the axial extension 56 of the pinion carrier 13d. Thus, the pinion carrier 13d and the speed-shaft clutch gear 47 are coaxially rotatable with the speed reduction gear 12 about the center axis of the axial extension 56 of the pinion carrier 13d. The second speed-shift clutch gear 48 of the low-high speed shifting clutch mechanism 45 is connected to or integral with the ring gear 13b of the first planetary gear assembly 13 through the hollow connecting member 50 and is thus rotatable with the ring gear 13b as in each of the embodiments hereinbefore described.

Furthermore, the sun gear 13a of the first planetary gear assembly 13 on the embodiment of FIGS. 6A and 6B has a tubular axial extension connected to or otherwise engaged by the pinion carrier 14d of the second planetary gear assembly 14 and is therefore coaxially rotatable with the pinion carrier 14d. The sun gear 14a of the second planetary gear assembly 14 is rotatable on this axial extension of the sun gear 13a and has a tubular axial extension which is coaxially mounted and rotatable on the axial extension of the sun gear 13a. The axial extension of the sun gear 14a has carried thereon the externally toothed power distributor gear 57 which is coaxially rotatable with the sun gear 14a and which is located axially intermediate between the first and second planetary gear assemblies 13 and 14. The power distributor gear 57 is held in constant mesh with the branchoff gear 29 of the right-angle power transfer unit 28. Furthermore, the ring gear 14b of the second planetary gear assembly 14 is toothed only internally and is coaxially connected to and rotatable with the rotatable differential gear casing 19 of the front final reduction gear unit 5 by means of the connecting drum 58.

The four-wheel-drive system having clutch mechanism 45 and the planetary gear assemblies 13 and 14 thus arranged is in other respects entirely similar to the embodiment of FIGS. 4A and 4B and, for this reason, no further description thereof regarding the construction and arrangement of the embodiment shown in FIGS. 6A and 6B will be herein incorporated.

In operation, the driving power delivered from the transmission output gear 11 is transmitted to the pinion carrier 13d of the first planetary gear assembly 13 by way of the coupling between the axial extension of the speed reduction gear 12 and the axial extension 56 of the pinion carrier 13d and causes the pinion carrier 13d to rotate about the common axis of rotation of the sun and ring gear 13a and 13b of the planetary gear assembly 13.

If, in this instance, the low-high speed shifting clutch mechanism 45 is held in a condition having the coupling sleeve 51 moved into the first axial position thereof in mesh with both of the first and second speed-shift clutch gears 47 and 48 as shown in FIG. 3A, the driving power transmitted to the speed reduction gear 12 is imparted not only to the pinion carrier 13d of the first planetary gear assembly 13 as above discussed but to the ring gear 13b of the planetary gear assembly 13 through the first speed-shift clutch gear 47, coupling sleeve 51, second speed-shift clutch gear 48 and connecting member 50. As a consequence, both of the pinion carrier 13d and ring gear 13b of the first planetary gear assembly 13 are driven to rotate at equal speeds about the common center axis of the gears 13a and 13b with the result that all the rotatable members of the first planetary gear assembly 13 are caused to rotate as a single unit about the common axis of rotation of the gears 13a and 13b. It therefore follows that the driving power transmitted to the speed reduction gear 12 is transmitted without reduction in speed of rotation to the sun gear 13a of the first planetary gear assembly 13 and further through the sun gear 13a to the pinion carrier 14d of the second planetary gear assembly 14 and thereby causes the pinion carrier 14d to rotate with the planet pinions 14c about the common axis of rotation of the sun gear 14a and ring gear 14b of the second planetary gear assembly 14.

If, on the other hand, the low-high speed shifting clutch mechanism 45 is maintained in a condition having the coupling sleeve 51 held in the second axial position thereof in mesh with the second and third speed-shift clutch gears 48 and 49, the ring gear 13a of the first planetary gear assembly 13 is fixed with respect to the transaxle casing structure 6 through the second speed-shift clutch gear 48, coupling sleeve 51, third speed-shift clutch gear 49 and stationary member 46, and thus, serves as a reaction member in the planetary gear assembly 13. Under these conditions, the rotation of the speed reduction gear 12 rotating with the pinion carrier 13d is transmitted to the sun gear 13a of the first planetary gear assembly 13 and accordingly to the pinion carrier 14d of the second planetary gear assembly with multiplication in speed at a ratio expressed as $(Ns+Nr)/Ns$ where Ns and Nr are representative of the respective numbers of the teeth of the sun gear 13a and ring gear 13b, as previously noted.

Driving power is thus transmitted from the speed reduction gear 12 to the pinion carrier 14d of the second planetary gear assembly 14 without or with multiplication in speed of rotation with the coupling sleeve 51 in the first or second axial position, respectively, thereof. The driving power transmitted in this manner to the pinion carrier 14d is split into two output components respectively driving the sun gear 14a and the ring gear 14b for rotation about the common axis of rotation thereof. The second planetary gear assembly 14 is thus permitted to act as a differential gear unit automatically adjusting the differential speed of rotation between the sun and ring gear 14a and 14b thereof.

The output component of the driving power distributed from the pinion carrier 13d to the ring gear 13b is transmitted through the front final reduction gear unit 5 to the front road wheels 15 and 15'. Likewise, the output component of the driving power distributed from the pinion carrier 13d to the sun gear 13a is transmitted through the power distributor gear 57, right-angle power transfer gear unit 28, propeller shaft 33, and rear final reduction gear unit 17 to the rear road wheels 18 and 18'.

It will be apparent that the embodiment of the four-wheel-drive system according to the present invention as hereinbefore described with reference to FIGS. 6A and 6B can be further modified to have incorporated therein a lock-up clutch mechanism similar to the lock-up clutch mechanism 45 in the embodiment of FIGS. 5A and 5B.

Form the foregoing description, it will have been appreciated that the four-wheel-drive system according to the present invention is characterized, inter alia, in the following respects:

(1) The output shaft 4b of the power transmission gear unit 4 provided in combination with the engine 1 positioned to have its output shaft 1a in a lateral direction of a four-wheel-driven vehicle is coupled to the front and rear final reduction gear units 5 and 17 through a series combination of two planetary gear assemblies 13 and 14 one of which is arranged to be capable of selectively producing two different gear ratios for low-speed and high-speed vehicle driving and the other of which is arranged to be capable of providing a differential action therein. The availability of the passenger and baggage spaces of the vehicle is for this reason significantly unencumbered and, in addition, the driveline for the four-wheel-drive vehicle can be constructed and arranged compactly.

(2) The four-wheel-drive system can be readily modified into a driving system for a two-wheel-driven or front-wheel-driven vehicle. Such modification can be made simply by separating the power transfer housing portion 6c from the clutch and transmission gear housing portions 6a and 6b of the transaxle casing structure 6 and removing from the axial extension of the speed reduction gear 12 the axial extension 15 of the sun gear 13a of the first planetary gear assembly 13 in each of the embodiments of FIGS. 1A and 1B, FIGS. 2A and 2B, FIGS. 4A and 4B and FIGS. 5A and 5B or the axial extension 56 of the pinion carrier 13d of the first planetary gear assembly 13 in the embodiment of FIGS. 3A and 3B or FIGS. 6A and 6B. A housing having the front final reduction gear unit 5 enclosed therein is then attached to the clutch housing portion 6a with the differential gear casing 19 of the front final reduction gear unit 5 splined or otherwise connected to the speed reduction gear 12 through the axial bore in the tubular axial extension of the gear 12. In this instance, it will be advantageous for the compactness of the construction of the driveline to have the side gear shaft 22 arranged to axially extend though the axial bore in the speed reduction gear 12 and the axial bore in each of the respective sun gears 13a and 13b of the first and second planetary gear assemblies 13 and 14.

While the present invention has been described as using a manually-operated five-forward-speed and one-reverse speed power transmission gear unit, it will be apparent that the four-wheel-drive system according to the present invention may use a manually-operated power transmission gear unit of another type or an automatically-operated or stepless power transmission system. Although, furthermore, it has been assumed that the power unit in each of the embodiments hereinbefore described is constituted by an internal combustion engine positioned at the front of a vehicle, this is simply by way of example and, thus, the power unit of the vehicle drive system according to the present invention may be constituted by any other type of power unit and may be positioned at the rear of a vehicle.

What is claimed is:

1. A four-wheel-drive system for a vehicle having at least two pairs of road wheels consisting of a pair of front road wheels and a pair of rear road wheels, comprising a power unit having an output shaft rotatable about an axis in a lateral direction of the vehicle;

a power transmission gear unit including transmission input and output shafts each having an axis of rotation substantially parallel with the axis of rotation of the output shaft of the power unit, and gears mounted on the transmission input and output shafts and arranged to be capable of selectively producing a plurality of ratios between the speeds of rotation of the transmission input and output shafts;

a speed reduction gear with which the transmission output shaft is held in driving engagement for driving the reduction gear to rotate about an axis of rotation thereof;

a first final reduction gear unit including gears arranged to split an input driving power into two output components to be transmitted to one of said two pairs of road wheels;

a second final reduction gear unit including gears arranged to split an input driving power into two output components to be transmitted to the other of said two pairs of road wheels;

first and second planetary gear assemblies each including an externally toothed sun gear rotatable about an axis of rotation thereof, an internally toothed ring gear coaxially encircling the sun gear and rotatable about the axis of rotation of the sun gear, at least two planet pinions each held in mesh with the sun gear and the ring gear and rotatable about an axis of rotation substantially parallel with the axis of rotation of the sun gear, and a pinion carrier interconnecting the planet pinions together so that the planet pinions are revolvable together around the axis of rotation of the sun gear, the speed reduction gear being held in driving engagement with one of the sun gear and the pinion carrier of the first planetary gear assembly, the other of the sun gear and the pinion carrier of the first planetary gear assembly being connected to and rotatable with the pinion carrier of the second planetary gear assembly, one of the sun gear and the ring gear of the second planetary gear assembly being in driving connection to one of the first and second final reduction gear units and the other of the sun gear and the ring gear of the second planetary gear assembly being in driving connection to the other of said first and second final reduction gear units;

a stationary member to be held stationary in the vehicle; and low-high-speed shifting clutch means operative to provide coupling selectively between said speed reduction gear and the ring gear of the first planetary gear assembly and between said stationary member and the ring gear of the first planetary gear assembly.

2. A four-wheel-drive system as set forth in claim 1, further comprising lock-up clutch means operatively intervening between the sun gear and the pinion carrier of said second planetary gear assembly and operative to couple the sun gear and the pinion carrier of the second planetary gear assembly when actuated.

3. A four-wheel-drive system as set forth in claim 1 or 2, in which said speed reduction gear has its axis of rotation substantially in parallel with the input and output shafts of said transmission gear unit and in which the sun gear, the ring gear and the pinion carrier of each of said first and second planetary gear assemblies have their common axis of rotation substantially in line with the axis of rotation of said speed reduction gear.

4. A four-wheel-drive system as set forth in claim 1 or 2, in which said first planetary gear assembly has one of its sun gear and its pinion carrier detachably connected to said speed reduction gear.

5. A four-wheel-drive system as set forth in claim 4, further comprising a casing structure including a first portion having said speed reduction gear enclosed therewithin and a second portion having said first and second planetary gear assemblies enclosed therewithin, said second portion being detachably connected to said first portion.

6. A four-wheel-drive system as set forth in claim 5, in which said speed reduction gear has its axis of rotation substantially in parallel with the input and output shafts of said transmission gear unit and in which the sun gear, the ring gear and the pinion carrier of each of said first and second planetary gear assemblies has their common axis of rotation substantially in line with the axis of rotation of said speed reduction gear.

7. A four-wheel-drive system as set forth in claim 1, further comprising a casing structure comprising a first housing portion having said speed reduction gear enclosed therein, a second housing portion integral with the first housing portion and having said transmission gear unit enclosed therewithin and a third housing portion having said first and second planetary gear assemblies enclosed therein, said third housing portion being detachably connected to said first housing portion in the neighborhood of the coupling between said speed reduction gear and one of the sun gear and the pinion carrier of said first planetary gear assembly.

8. A four-wheel-drive system for a vehicle having at least two pairs of road wheels consisting of a pair of front road wheels and a pair of rear road wheels, comprising a power unit having an output shaft rotatable about an axis in a lateral direction of the vehicle;

a power transmission gear unit including transmission input and output shafts each having an axis of rotation substantially parallel with the axis of rotation of the output shaft of the power unit, and gears mounted on the transmission input and output shafts and arranged to be capable of selectively producing a plurality of ratios between the speeds of rotation of the transmission input and output shafts;

a speed reduction gear with which the transmission output shaft is held in driving engagement for driving the reduction gear to rotate about an axis of rotation thereof;

a. first final reduction gear unit including gears arranged to split and input driving power into two output components to be transmitted to one of said two pairs of road wheels;

a second final reduction gear unit including gears arranged to split an input driving power into two output components to be transmitted to the other of said two pairs of road wheels;

first and second planetary gear assemblies each including an externally toothed sun gear rotatable about an axis of rotation thereof, an internally toothed ring gear coaxially encircling the sun gear and rotatable about the axis of rotation of the sun gear, at least two planet pinions each held in mesh with the sun gear and the ring gear and rotatable about an axis of rotation substantially parallel with the axis of rotation of the sun gear, and a pinion carrier interconnecting the planet pinions together so that the planet pinions are revolvable together around the axis of rotation of the sun gear, the speed reduction gear being held in driving engagement with one of the sun gear and the pinion carrier of the first planetary gear assembly, the other of the sun gear and the pinion carrier of the first planetary gear assembly being connected to and rotatable with the pinion carrier of the second planetary gear assembly, one of the sun gear and the ring gear of the second planetary gear assembly being in driving connection to one of the first and second final reduction gear units and the other of the sun gear and the ring gear of the second planetary gear assembly being in driving connection to the other of said first and second final reduction gear units;

a stationary member to be held stationary in the vehicle; and low-high-speed shifting clutch means operative to provide coupling selectively between said speed reduction gear and the ring gear of the first planetary gear assembly and between said stationary member and the ring gear of the first planetary gear assembly, wherein said speed reduction gear has its axis of rotation directed substantially in parallel with the input and output shafts of said transmission gear unit and in which the sun gear, the ring gear and the pinion carrier of each of said first and second planetary gear assemblies have their common axis of rotation substantially in line with the axis of rotation of said speed reduction gear, and wherein said speed reduction gear is formed with an axial bore having a center axis substantially aligned with said common axis and the sun gear of each of said first and second planetary gear assemblies is formed with an axial bore having a center axis substantially coincident with said common axis, said first final reduction gear unit being positioned closer to said power transmission gear unit than said second final reduction gear unit, said first final reduction gear unit being connected to two output shafts one of which is positioned closer to the power transmission gear unit than the latter, the output shaft closer to the transmission gear unit axially extending in part through the axial bore in the sun gear of each of said planetary gear assemblies and in part through the axial bore in said speed reduction gear.

9. A four-wheel-drive system for a vehicle having at least two pairs of road wheels consisting of a pair of front road wheels and a pair of rear road wheels, comprising a power unit having an output shaft rotatable about an axis in a lateral direction of the vehicle;

a power transmission gear unit including transmission input and output shafts each having an axis of rotation substantially parallel with the axis of rotation of the output shaft of the power unit, and gears mounted on the transmission input and output shafts and arranged to be capable of selectively producing a plurality of ratios between the speeds of rotation of the transmission input and output shafts;

a speed reduction gear with which the transmission output shaft is held in driving engagement for driving the reduction gear to rotate about an axis of rotation thereof;

a first final reduction gear unit including gears arranged to split an input driving power into two output components to be transmitted to one of said two pairs of road wheels;

a second final reduction gear unit including gears arranged to split an input driving power into two output components to be transmitted to the other of said two pairs of road wheels;

first and second planetary gear assemblies each including an externally toothed sun gear rotatable about an axis of rotation thereof, an internally toothed ring gear coaxially encircling the sun gear and rotatable about the axis of rotation of the sun gear, at least two planet pinions each held in mesh with the sun gear and the ring gear and rotatable about an axis of rotation substantially parallel with the axis of rotation of the sun gear, and a pinion carrier interconnecting the planet pinions together so that the planet pinions are revolvable together around the axis of rotation of the sun gear, one of the sun gear and the pinion carrier of the first planetary gear assembly being detachably connected to said speed reduction gear, the other of the sun gear and the pinion carrier of the first planetary gear assembly being connected to and rotatable with the pinion carrier of the second planetary gear assembly, one of the sun gear and the ring gear of the second planetary gear assembly being in driving connection to one of the first and second final reduction gear units and the other of the sun gear and the ring gear of the second planetary gear assembly being in driving connection to the other of said first and second final reduction gear units;

a stationary member to be held stationary in the vehicle;

low-high-speed shifting clutch means operative to provide coupling selectively between said speed reduction gear and the ring gear of the first planetary gear assembly and between said stationary member and the ring gear of the first planetary gear assembly; and a casing structure including a first portion having said speed reduction gear enclosed therewithin and a second portion having said first and second planetary gear assemblies enclosed therewithin, said second portion being detachably connected to said first portion, wherein the first and second portions of said casing structure are detachably connected together in the neighborhood of the coupling between said speed reduction gear and one of the sun gear and the pinion carrier of said first planetary gear assembly.

10. A four-wheel-drive system for a vehicle having at least two pairs of road wheels consisting of a pair of front road wheels and a pair of rear road wheels, comprising a power unit having an output shaft rotatable about an axis in a lateral direction of the vehicle;

a power transmission gear unit including transmission input and output shafts each having an axis of rotation substantially parallel with the axis of rotation of the output shaft of the power unit, and gears mounted on the transmission input and output shafts and arranged to be capable of selectively producing a plurality of ratios between the speeds of rotation of the transmission input and output shafts;

a speed reduction gear with which the transmission output shaft is held in driving engagement for driving the reduction gear to rotate about an axis of rotation thereof;

a first final reduction gear unit including gears arranged to split an input driving power into two output components to be transmitted to one of said two pairs of road wheels;

a second final reduction gear unit including gears arranged to split an input driving power into two output components to be transmitted to the other of said two pairs of road wheels;

first and second planetary gear assemblies each including an externally toothed sun gear rotatable about an axis of rotation thereof, an internally toothed ring gear coaxially encircling the sun gear and rotatable about the axis of rotation of the sun gear, at least two planet pinions each held in mesh with the sun gear and the ring gear and rotatable about an axis of rotation substantially parallel with the axis of rotation of the sun gear, and a pinion carrier interconnecting the planet pinions together so that the planet pinions are revolvable together around the axis of rotation of the sun gear, one of the sun gear and the pinion carrier of the first planetary gear assembly being detachably connected to said speed reduction gear, the other of the sun gear and the pinion carrier of the first planetary gear assembly being connected to and rotatable with the pinion carrier of the second planetary gear assembly, one of the sun gear and the ring gear of the second planetary gear assembly being in driving connection to one of the first and second final reduction gear units and the other of the sun gear and the ring gear of the second planetary gear assembly being in driving connection to the other of said first and second final reduction gear units;

a stationary member to be held stationary in the vehicle;

low-high-speed shifting clutch means operative to provide coupling selectively between said speed reduction gear and the ring gear of the first planetary gear assembly and between said stationary member and the ring gear of the first planetary gear assembly; and a casing structure including a first portion having said speed reduction gear enclosed therewithin and a second portion having said first and second planetary gear assemblies enclosed therewithin, said second portion being detachably connected to said first portion, wherein said speed reduction gear has its axis of rotation substantially in parallel with the input and output shafts of said transmission gear unit and in which the sun gear, the ring gear and the pinion carrier of each of said first and second planetary gear assemblies has their common axis of rotation substantially in line with the axis of rotation of said speed reduction gear, and wherein said speed reduction gear is formed with an axial bore having a center axis substantially aligned with said common axis and the sun gear of each of said first and second planetary gear assemblies is formed with an axial bore having a center axis substantially coincident with said common axis and in which said first final reduction gear unit is positioned closer to said power transmission gear unit than said second final reduction gear unit, said first final reduction gear unit being connected to two output shafts one of which is positioned closer to the power transmission gear unit than the latter, the output shaft closer to the transmission gear unit axially extending in part through the axial bore in the sun gear of each of said planetary gear assemblies and in part through the axial bore in said speed reduction gear.

11. A four-wheel-drive system as set forth in claim 8, further comprising lock-up clutch means operatively intervening between the sun gear and the pinion carrier of said second planetary gear assembly and operative to couple the sun gear and the pinion carrier of the second planetary gear assembly when actuated.

* * * * *